US012361616B2

United States Patent
Kolkin et al.

(10) Patent No.: US 12,361,616 B2
(45) Date of Patent: Jul. 15, 2025

(54) IMAGE GENERATION USING A DIFFUSION MODEL

(71) Applicant: ADOBE INC., San Jose, CA (US)

(72) Inventors: Nicholas Isaac Kolkin, San Francisco, CA (US); Elya Shechtman, Seattle, WA (US)

(73) Assignee: ADOBE INC., San Jose, CA (US)

( * ) Notice: Subject to any disclaimer, the term of this patent is extended or adjusted under 35 U.S.C. 154(b) by 199 days.

(21) Appl. No.: 18/169,444

(22) Filed: Feb. 15, 2023

(65) Prior Publication Data

US 2024/0135610 A1    Apr. 25, 2024

Related U.S. Application Data

(60) Provisional application No. 63/379,808, filed on Oct. 17, 2022.

(51) Int. Cl.
  *G06T 11/60*    (2006.01)
  *G06T 5/70*    (2024.01)

(52) U.S. Cl.
  CPC .............. *G06T 11/60* (2013.01); *G06T 5/70* (2024.01); *G06T 2200/24* (2013.01)

(58) Field of Classification Search
  CPC ........ G06T 11/60; G06T 5/07; G06T 2200/24
  USPC ....................................................... 345/418
  See application file for complete search history.

(56) References Cited

U.S. PATENT DOCUMENTS

| 12,118,976 | B1* | 10/2024 | Chen | G10L 13/027 |
| 2023/0095092 | A1* | 3/2023 | Xiao | G06T 5/70 |
| | | | | 382/254 |
| 2023/0118966 | A1* | 4/2023 | Liu | G10L 13/02 |
| | | | | 345/473 |
| 2023/0377690 | A1* | 11/2023 | Anand | G16B 15/00 |
| 2024/0338859 | A1* | 10/2024 | Marri | G06F 40/58 |
| 2024/0355018 | A1* | 10/2024 | Aggarwal | G06T 7/11 |
| 2024/0355022 | A1* | 10/2024 | Shi | G06T 7/194 |

OTHER PUBLICATIONS

Brooks T, Holynski A, Efros AA. Instructpix2pix: Learning to follow image editing instructions. InProceedings of the IEEE/CVF Conference on Computer Vision and Pattern Recognition 2023 (pp. 18392-18402).*

Song, J., Meng, C. and Ermon, S., 2020. Denoising diffusion implicit models. arXiv preprint arXiv:2010.02502.*

(Continued)

*Primary Examiner* — Phu K Nguyen
(74) *Attorney, Agent, or Firm* — CHAU & ASSOCIATES, LLC

(57) ABSTRACT

Systems and methods for image generation are provided. An aspect of the systems and methods for image generation includes obtaining an original image depicting an element and a target prompt describing a modification to the element. The system may then compute a first output and a second output using a diffusion model. The first output is based on a description of the element and the second output is based on the target prompt. The system then computes a difference between the first output and the second output, and generates a modified image including the modification to the element of the original image based on the difference.

20 Claims, 13 Drawing Sheets

(56) References Cited

OTHER PUBLICATIONS

Gu J, Wang S, Zhao H, Lu T, Zhang X, Wu Z, Xu S, Zhang W, Jiang YG, Xu H. Reuse and diffuse: Iterative denoising for text-to-video generation. arXiv preprint arXiv:2309.03549. Sep. 7, 2023.*
Dhariwal P, Nichol A. Diffusion models beat gans on image synthesis. Advances in neural information processing systems. Dec. 6, 2021;34:8780-94.*
Croitoru FA, Hondru V, Ionescu RT, Shah M. Diffusion models in vision: A survey. IEEE Transactions on Pattern Analysis and Machine Intelligence. Mar. 27, 2023;45(9):10850-69.*
Avrahami O, Lischinski D, Fried O. Blended Diffusion for Text-driven Editing of Natural Images. In2022 IEEE/CVF Conference on Computer Vision and Pattern Recognition (CVPR) Jun. 18, 2022 (pp. 18187-18197). IEEE.*
Ho, J., Jain, A. and Abbeel, P., 2020. Denoising diffusion probabilistic models. Advances in neural information processing systems, 33, pp. 6840-6851.*
Ramesh, et al., "Hierarchical Text-Conditional Image Generation with CLIP Latents"; arXiv preprint: arXiv:2204.06125v1 [cs.CV] Apr. 13, 2022, 27 pages.
Saharia, et al., "Photorealistic Text-to-Image Diffusion Models with Deep Language Understanding", arXiv preprint: arXiv:2205.11487v1 [cs.CV] May 23, 2022, 46 pages.
Rombach, et al., "High-Resolution Image Synthesis with Latent Diffusion Models", arXiv preprint: arXiv:2112.10752v2 [cs.CV] Apr. 13, 2022, 45 pages.
Meng, et al., "SDEdit: Guided Image Synthesis and Editing with Stochastic Differential Equations", arXiv preprint: arXiv:2108.01073v2 [cs.CV] Jan. 5, 2022, 33 pages.
Ho, et al., "Classifier-Free Diffusion Guidance", arXiv preprint: arXiv:2207.12598v1 [cs.LG] Jul. 26, 2022, 14 pages.
Karras, et al., "Elucidating the Design Space of Diffusion-Based Generative Models", arXiv preprint: arXiv:2206.00364v2 [cs.CV] Oct. 11, 2022, 47 pages.
Hertz, et al., "Prompt-to-Prompt Image Editing with Cross Attention Control", arXiv preprint: arXiv:2208.01626v1 [cs.CV] Aug. 2, 2022, 19 pages.
Liu, et al., "Compositional Visual Generation with Composable Diffusion Models", arXiv preprint: arXiv:2206.01714v4 [cs.CV] Jul. 27, 2022, 28 pages.

* cited by examiner

IMAGE GENERATION USING A DIFFUSION MODEL

CROSS-REFERENCE TO RELATED APPLICATION

This application claims priority under 35 U.S.C. § 119 to U.S. Provisional Application No. 63/379,808, filed on Oct. 17, 2022, in the United States Patent and Trademark Office, the disclosure of which is incorporated by reference herein in its entirety.

BACKGROUND

The following relates generally to image generation, and more specifically to image generation using a diffusion model. A diffusion model is a probabilistic model that denoises noisy input data to obtain an output (such as an image). Prompt-driven diffusion models have two primary modes of operation. In a "text to image" mode, an image is created from scratch (i.e., from random noise) to match a prompt. In an "image to image" mode, both a starting image and a prompt are provided to the model as input, and the model produces an output by mapping from the starting image and partial random noise based on the prompt to generate a modified output image.

Accordingly, a diffusion model can be used to perform image generation by altering an element of an input image based on a prompt.

SUMMARY

Aspects of the present disclosure provide systems and methods for image generation. According to an aspect of the present disclosure, an image generation system receives an original image, an anchor prompt (such as a text prompt) describing an element of the original image (such as an object depicted in the image), and a target prompt (such as an additional text prompt) describing a desired modification to the element. Using a diffusion model, the image generation system generates an output image that depicts the desired modification based on a comparison between the anchor prompt and the target prompt.

By generating the output image based on the comparison between the anchor prompt that describes the element and the target prompt that describes the modification to the element, the diffusion model is encouraged to use the entirety of the target prompt, rather than only a portion of the target prompt, in the image generation process. In other words, for example, the anchor prompt "anchors" an output of the diffusion model to the entirety of the target prompt during a reverse diffusion process. Therefore, the output image adheres more closely to the target prompt than if the target prompt had been used by itself during the image generation process. The image generation system thereby generates a more accurate modified image than conventional image generation systems, which tend to ignore details (such as prepositional phrases or adjectives) that are present in an input prompt that describes modifications to an image.

A method, apparatus, non-transitory computer readable medium, and system for image generation are described. One or more aspects of the method, apparatus, non-transitory computer readable medium, and system include obtaining an original image, an anchor prompt describing an element of the original image, and a target prompt describing a modification to the element of the original image; computing a first output based on the anchor prompt and a second output based on the target prompt using a diffusion model; computing a difference between the first output and the second output; and generating a modified image including the modification to the element of the original image based on the difference.

A method, apparatus, non-transitory computer readable medium, and system for image generation are described. One or more aspects of the method, apparatus, non-transitory computer readable medium, and system include obtaining an original image, an anchor prompt describing an element of the original image, and a target prompt describing a modification to an element of the original image; computing a first output based on the anchor prompt and a second output based on the target prompt using a diffusion model; computing a difference between the first output and the second output; and generating a modified image including the modification to the element of the original image based on the difference.

An apparatus and system for image generation are described. One or more aspects of the apparatus and system include one or more processors; one or more memory components coupled with the one or more processors; and a diffusion model configured to compute a first output based on an anchor prompt and a second output based on a target prompt, compute a difference between the first output and the second output, and generate a modified image including a modification to an element of an original image based on the difference.

DETAILED DESCRIPTION

Figure 1:
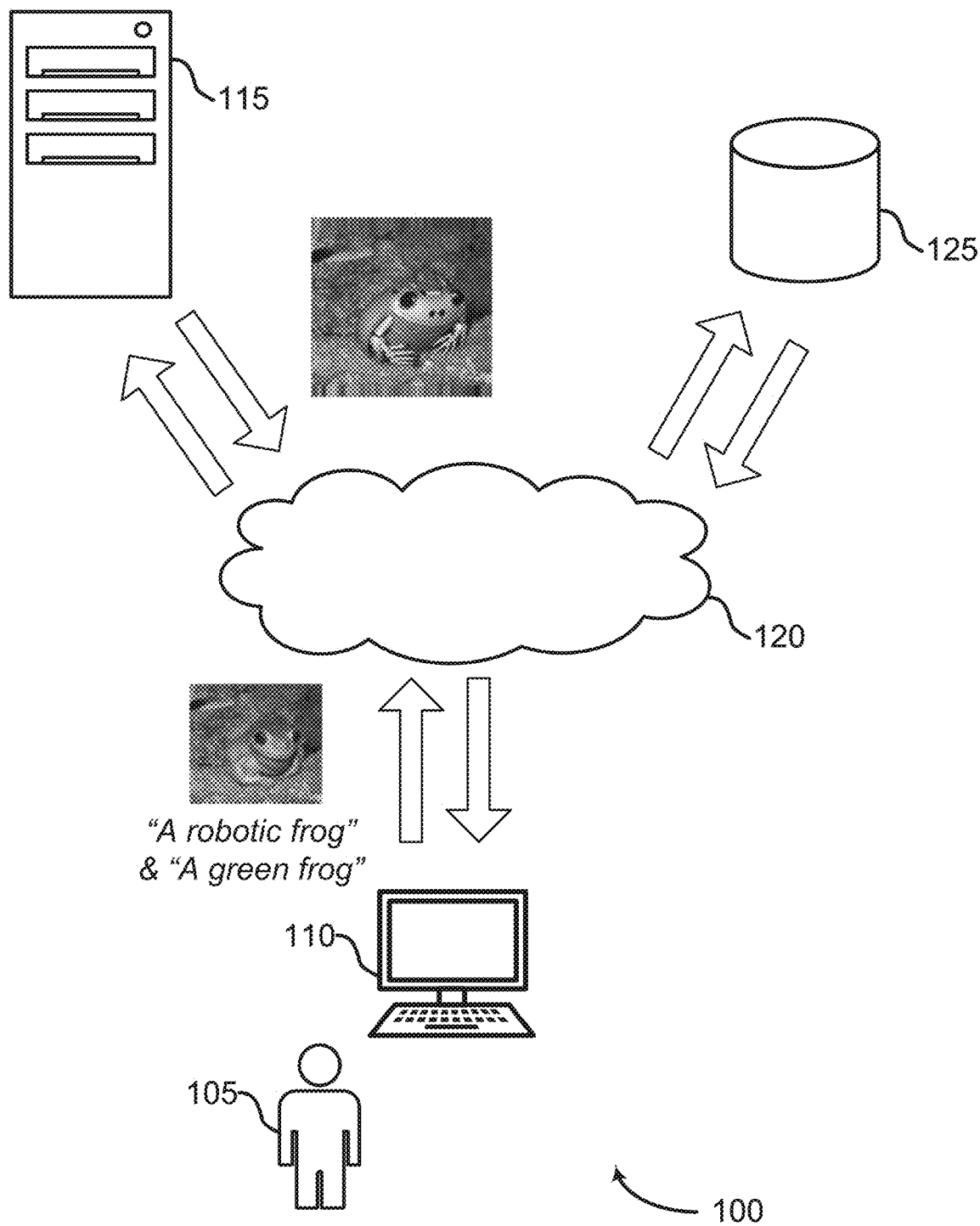
FIG. 1 shows an example of an image generation system according to aspects of the present disclosure.

The following relates generally to image generation, and more specifically to image generation using a diffusion model. A diffusion model is a probabilistic model that denoises noisy input data to obtain an output (such as an image). Prompt-driven diffusion models have two primary modes of operation. In a "text to image" mode, an image is created from scratch (i.e., from random noise) to match a prompt. In an "image to image" mode, both a starting image and a guidance prompt are provided to the model as input, and the model produces an output by mapping from the starting image and partial random noise based on the guidance prompt to generate a modified output image.

Accordingly, a diffusion model can be used to perform image generation by altering an element of an input image based on a prompt. For example, some conventional image generation systems use diffusion models that are trained to combine noise with an input image at different weights, resulting in a modified version of the input image, rather than a completely novel/random image. An example of this approach to image generation includes classifier-free diffusion guidance, in which a text prompt describing an input can be replaced by a NULL string (e.g., an empty text string) during training of a diffusion model. Then, during inference, the influence of the text prompt on the output as compared to the NULL string can be adjusted.

However, conventional image generation systems, including systems that use classifier-free diffusion guidance, tend to only use a portion of a guidance prompt. For example, when the guidance prompt is a text prompt, conventional image generation systems tend to ignore prepositional phrases and adjectives included in the text prompt, resulting in an output image that does not accurately depict an intended modification to an input image.

Aspects of the present disclosure provide systems and methods for image generation. According to an aspect of the present disclosure, an image generation system receives an original image, an anchor prompt (such as a text prompt) describing an element of the original image (such as an object depicted in the image), and a target prompt (such as an additional text prompt) describing a desired modification to the element. Using a diffusion model, the image generation system generates an output image that depicts the desired modification based on a comparison between the anchor prompt and the target prompt.

By generating the output image based on the comparison between the anchor prompt that describes the element and the target prompt that describes the modification to the element, the diffusion model is encouraged to use the entirety of the target prompt, rather than only a portion of the target prompt, in the image generation process. In other words, for example, the anchor prompt "anchors" an output of the diffusion model to the entirety of the target prompt during a reverse diffusion process. Therefore, the output image adheres more closely to the target prompt than if the target prompt had been used by itself during the image generation process. The image generation system thereby generates a more accurate output image than conventional image generation systems, which tend to ignore details (such as prepositional phrases or adjectives) describing modifications to an image that are present in an input prompt.

According to some aspects, an image generation system includes a user interface and a diffusion model. In some embodiments, the user interface is configured to obtain an original image, an anchor prompt describing an element of the original image, and a target prompt describing a modification to the element of the original image. In some embodiments, the diffusion model is configured to compute a first output based on the anchor prompt and a second output based on the target prompt, compute a difference between the first output and the second output, and generate a modified image including the modification to the element of the original image based on the difference.

As used herein, a "prompt" refers to an input (such as a string of text, an image, or other suitable input) that guides an output of a reverse diffusion process implemented by a diffusion model.

As used herein, an "output" refers to a portion of a mapping function used during a reverse diffusion process to update a sampling of a diffusion model at various time steps and noise levels of the reverse diffusion process.

As used herein, a "mapping function" refers to a function that guides a diffusion model in mapping from a noise image to a modified image based on one or more prompts (such as an anchor prompt or a target prompt).

As used herein, an "element" refers to something that is depicted in an image. For example, an element can be an object, a background, a color, a shape, a texture, a style, etc.

An embodiment of the present disclosure can be used in an image editing context. In an example, a user provides an original image, a target text prompt, and an anchor text prompt to an image generation system via a user interface provided by the image generation system on a user device (such as a personal computer). The original image depicts a black classic car parked in a driveway in front of a house, the target text prompt includes the words "A cartoon of a cute classic car" that describe a modification of an element of the image, and the anchor text prompt includes the words "A black classic car" that describe the element of the image. The image generation system uses a forward diffusion process to add noise to the image, and uses a diffusion model to implement a reverse diffusion process to gradually denoise the noised image. At each step of the reverse diffusion process, the sampled output is influenced by both an output corresponding to the anchor prompt and an output corresponding to the target prompt.

The result of the reverse diffusion process is an image that depicts a cartoon of a cute classic car parked in the driveway in front of the house. By using the anchor prompt to influence the reverse diffusion process, the diffusion model outputs an image that is "anchored" towards the full target prompt and away from the original input image. By contrast, a conventional diffusion model provided with only the original image and the guidance prompt will tend to produce an image depicting a car that is less "cute" and "cartoon-like", because the word "cute" is an adjective and "a cartoon of" is a prepositional phrase that are afforded less importance by the diffusion model than the noun "car". The image generation system then displays the output image to the user via the user interface.

Further example applications of the present disclosure in the image editing context are provided with reference to FIGS. 1-4. Details regarding the architecture of the image generation system are provided with reference to FIGS. 1, 5-9, and 13. Examples of a process for image generation are provided with reference to FIGS. 10-11. Examples of a process for training a diffusion model are provided with reference to FIG. 12.

Image Generation System

A system and an apparatus for image generation is described with reference to FIGS. 1-9 and 13. One or more aspects of the system and the apparatus include one or more processors; one or more memory components coupled with the one or more processors; and a diffusion model configured to compute a first output based on an anchor prompt and a second output based on a target prompt, compute a difference between the first output and the second output, and generate a modified image including a modification to an element of an original image based on the difference.

Some examples of the system and the apparatus further include a mask generation model configured to generate a mask indicating a location of the element, wherein the modified image is generated based on the mask.

Some examples of the system and the apparatus further include a noise component configured to add first noise to the original image to obtain a noise image, wherein the diffusion model is further configured to remove second noise from the noise image based on the difference to obtain the modified image. Some examples of the system and the apparatus further include a user interface configured to obtain the original image and the target prompt.

Some examples of the system and the apparatus further include a text encoder configured to encode the anchor prompt and the target prompt to obtain an encoded anchor prompt and an encoded target prompt, wherein the first output and the second output are based on the encoded anchor prompt and the encoded target prompt, respectively.

FIG. 1 shows an example of an image generation system 100 according to aspects of the present disclosure. The example shown includes user 105, user device 110, image generation apparatus 115, cloud 120, and database 125. Image generation apparatus 115 is an example of, or includes aspects of, the corresponding element described with reference to FIG. 5.

Referring to FIG. 1, user 105 provides an original image, a target text prompt, and an anchor text prompt to image generation apparatus 115 via a user interface provided by image generation apparatus 115 on user device 110. The original image depicts a green frog sitting in a brown landscape, the target text prompt includes the words "A robotic frog" that describe a modification of an element of the image, and the anchor text prompt includes the words "A green frog" that describe the element of the image. Image generation apparatus 115 uses a forward diffusion process to add noise to the original image, and uses a diffusion model to implement a reverse diffusion process to gradually denoise the noised image. At each step of the reverse diffusion process, the sampled output is influenced by both an output corresponding to the anchor prompt and an output corresponding to the target prompt.

The result of the reverse diffusion process is an image that depicts a robotic frog sitting in the brown landscape. By using the anchor prompt to influence the reverse diffusion process, the diffusion model outputs an image that is "anchored" towards the full target prompt and away from the original input image. By contrast, a conventional diffusion model provided with only the original image and the guidance prompt will tend to produce an image depicting a frog that is less "robotic", because the word "robotic" in the target prompt is an adjective that would be less influential in the reverse diffusion process than the noun "frog".

According to some aspects, user device 110 is a personal computer, laptop computer, mainframe computer, palmtop computer, personal assistant, mobile device, or any other suitable processing apparatus. In some examples, user device 110 includes software that displays a user interface (e.g., a graphical user interface) provided by image generation apparatus 115. In some aspects, the user interface allows user 105 to provide a prompt (such as a text prompt) and/or layout information (such as a mask) to image generation apparatus 115. In some aspects, the user interface allows user 105 to provide an input image to image generation apparatus 115. In some aspects, image generation apparatus 115 provides an output image to user 105 via the user interface.

According to some aspects, a user device user interface enables user 105 to interact with user device 110. In some embodiments, the user device user interface may include an audio device, such as an external speaker system, an external display device such as a display screen, or an input device (e.g., a remote-control device interfaced with the user interface directly or through an I/O controller module). In some cases, the user device user interface may be a graphical user interface.

According to some aspects, image generation apparatus 115 includes a computer implemented network. In some embodiments, the computer implemented network includes a machine learning model (such as a diffusion model as described with reference to FIGS. 5, 6, and 9). In some embodiments, image generation apparatus 115 also includes one or more processors, a memory subsystem, a communication interface, an I/O interface, one or more user interface components, and a bus as described with reference to FIG. 13. Additionally, in some embodiments, image generation apparatus 115 communicates with user device 110 and database 125 via cloud 120.

In some cases, image generation apparatus 115 is implemented on a server. A server provides one or more functions to users linked by way of one or more of various networks, such as cloud 120. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Image generation apparatus 115 is an example of, or includes aspects of, the corresponding element described with reference to FIG. 5. Further detail regarding the architecture of image generation apparatus 115 is provided with reference to FIGS. 5-9 and 13. Further detail regarding a process for image generation is provided with reference to FIGS. 10-11. Further detail regarding a process for training a machine learning model of image generation apparatus 115 is provided with reference to FIG. 12.

Cloud 120 is a computer network configured to provide on-demand availability of computer system resources, such as data storage and computing power. In some examples, cloud 120 provides resources without active management by a user. The term "cloud" is sometimes used to describe data centers available to many users over the Internet. Some large cloud networks have functions distributed over multiple locations from central servers. A server is designated an edge server if it has a direct or close connection to a user. In some cases, cloud 120 is limited to a single organization. In other examples, cloud 120 is available to many organizations. In one example, cloud 120 includes a multi-layer communications network comprising multiple edge routers and core routers. In another example, cloud 120 is based on a local collection of switches in a single physical location. According to some aspects, cloud 120 provides communications between user device 110, image generation apparatus 115, and database 125.

Database 125 is an organized collection of data. In an example, database 125 stores data in a specified format known as a schema. According to some aspects, database 125 is structured as a single database, a distributed database, multiple distributed databases, or an emergency backup database. In some cases, a database controller manages data storage and processing in database 125. In some cases, a user interacts with the database controller. In other cases, the database controller operates automatically without interaction from the user. According to some aspects, database 125 is external to image generation apparatus 115 and communicates with image generation apparatus 115 via cloud 120. According to some aspects, database 125 is included in image generation apparatus 115.

Figure 2:
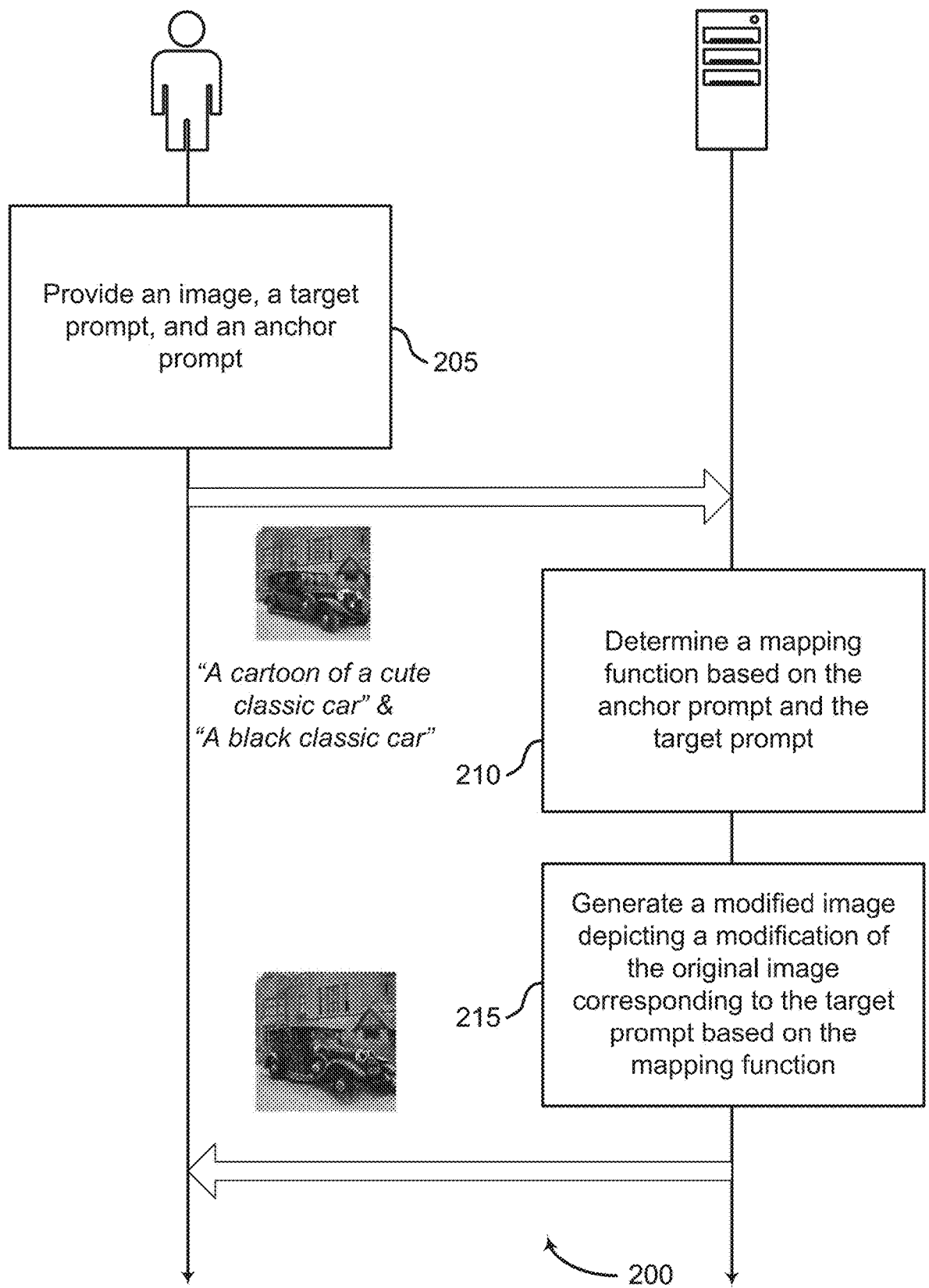
FIG. 2 shows an example of a method for image generation according to aspects of the present disclosure.

FIG. 2 shows an example of a method 200 for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, an embodiment of the present disclosure is used in an image editing context. In an example, a user provides an original image, a target text prompt, and an anchor text prompt to an image generation system via a user interface provided by the image generation system on a user device (such as a personal computer). The original image depicts a black classic car parked in a driveway in front of a house, the target text prompt includes the words "A cartoon of a cute classic car" that describe a modification of an element of the image, and the anchor text prompt includes the words "A black classic car" that describe the element of the image. The image generation system uses a forward diffusion process to add noise to the image, and uses a diffusion model to implement a reverse diffusion process to gradually denoise the noised image. At each step of the reverse diffusion process, the sampled output is influenced by both an output corresponding to the anchor prompt (e.g., a first portion of a mapping function) and an output corresponding to the target prompt (e.g., a second portion of the mapping function).

The result of the reverse diffusion process is an image that depicts a cartoon of a cute classic car parked in the driveway in front of the house. By using the anchor prompt to influence the reverse diffusion process, the diffusion model outputs an image that is "anchored" towards the target prompt and away from the original input image. By contrast, a conventional diffusion model provided with only the original image and the guidance prompt will tend to produce an image depicting a car that is less "cute" and "cartoon-like", because the word "cute" is an adjective and "a cartoon of" is a prepositional phrase that are afforded less importance by the diffusion model than the noun "car". The image generation system then displays the output image to the user via the user interface.

At operation 205, the user provides an image, an anchor prompt, and a target prompt. For example, the user uploads the image to a graphical user interface displayed by an image generation apparatus on a user device, and the user types the anchor prompt and the target prompt into respective anchor prompt and target prompt fields of the graphical user interface. In some embodiments, the target prompt is a text prompt that describes a modification to an element of the image. In some embodiments, the anchor prompt is a text prompt that describes the element of the image.

In some examples the anchor prompt can be generated automatically based on the input image. For example, the anchor prompt can be generated based on the image using an image captioning model. In some cases, multiple captions are generated and a user selects one of the captions as an anchor prompt. In some cases, the anchor prompt is generated based on a comparison of the image and the target prompt. For example, text describing the image can be generated automatically, and a portion of the generated text correspond to the target prompt can be selected as the anchor prompt. In some cases, a portion of the generated text including a different modifier from the target prompt (but modifying the same element of the image) can be selected.

At operation 210, the system determines a mapping function based on the anchor prompt and the target prompt. In some cases, the operations of this step refer to, or may be performed by, an image generation system as described with reference to FIG. 1. For example, after adding noise to the image in a forward diffusion process as described with reference to FIGS. 6, 10, and 11, a diffusion model of the image generation system determines a mapping function based on the anchor prompt and the target prompt as described with reference to FIG. 10.

At operation 215, the system generates a modified image depicting a modification of the original image corresponding to the target prompt based on the mapping function. In some cases, the operations of this step refer to, or may be performed by, an image generation system as described with reference to FIG. 1. For example, the diffusion model iteratively samples intermediate noise images at various time steps of a reverse diffusion process according to the mapping function until a modified image is obtained, as described with reference to FIGS. 10 and 11. In some embodiments, the modified image depicts the modification to the image described by the target prompt. Finally, in some embodiments, the image generation system displays the modified image to the user via the user interface.

Figure 3:
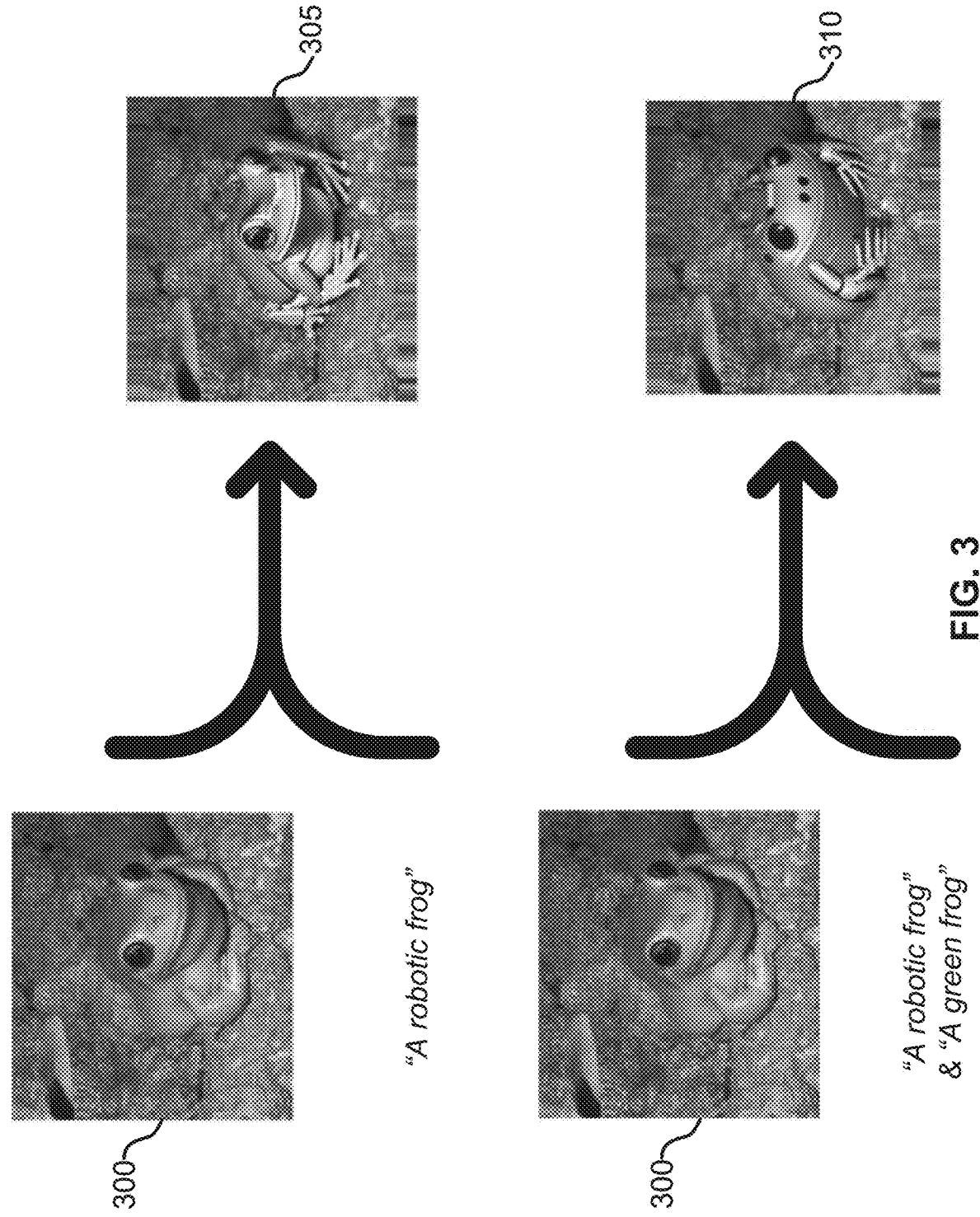
FIG. 3 shows a first example of a comparison of generated images according to aspects of the present disclosure.

FIG. 3 shows a first example of a comparison of generated images according to aspects of the present disclosure. The example shown includes original image 300, comparative image 305, and modified image 310. Original image 300 is an example of, or includes aspects of, the corresponding element described with reference to FIGS. 4, 8, and 9. Comparative image 305 is an example of, or includes aspects of, the corresponding element described with reference to FIGS. 4 and 8. Modified image 310 is an example of, or includes aspects of, the corresponding element described with reference to FIGS. 4 and 9.

FIG. 3 illustrates comparison between a modified image generated by an image generation system according to aspects of the present disclosure and a comparative image generated by a comparative image generation system. Referring to FIG. 3, the comparative image generation system receives original image 300 depicting a green frog sitting in a brown landscape and a guidance text prompt including the words "A robotic frog" as input and uses a diffusion model to generate comparative image 305 in response. As shown in FIG. 3, comparative image 305 depicts a frog that has been modified from the frog depicted in the original image, but does not depict a frog that is overtly "robotic" in appearance.

In contrast, the image generation system according to the present disclosure generates modified image 310 depicting a robotic-looking frog based on original image 300, a target prompt including the words "A robotic frog", and an anchor prompt including the words "A green frog". The anchor prompt describes the element of the original image that the target prompt intends to modify. Because a diffusion model of the image generation system computes modified image 310 based on the anchor prompt, the frog depicted in modified image 310 is more reflective of the intended result of the target prompt (indicated by the adjective "robotic") and less reflective of the frog depicted in original image 300. As shown in FIG. 3, it is apparent that modified image 310 is a more accurate representation of "A robotic frog" than comparative image 305.

Figure 4:
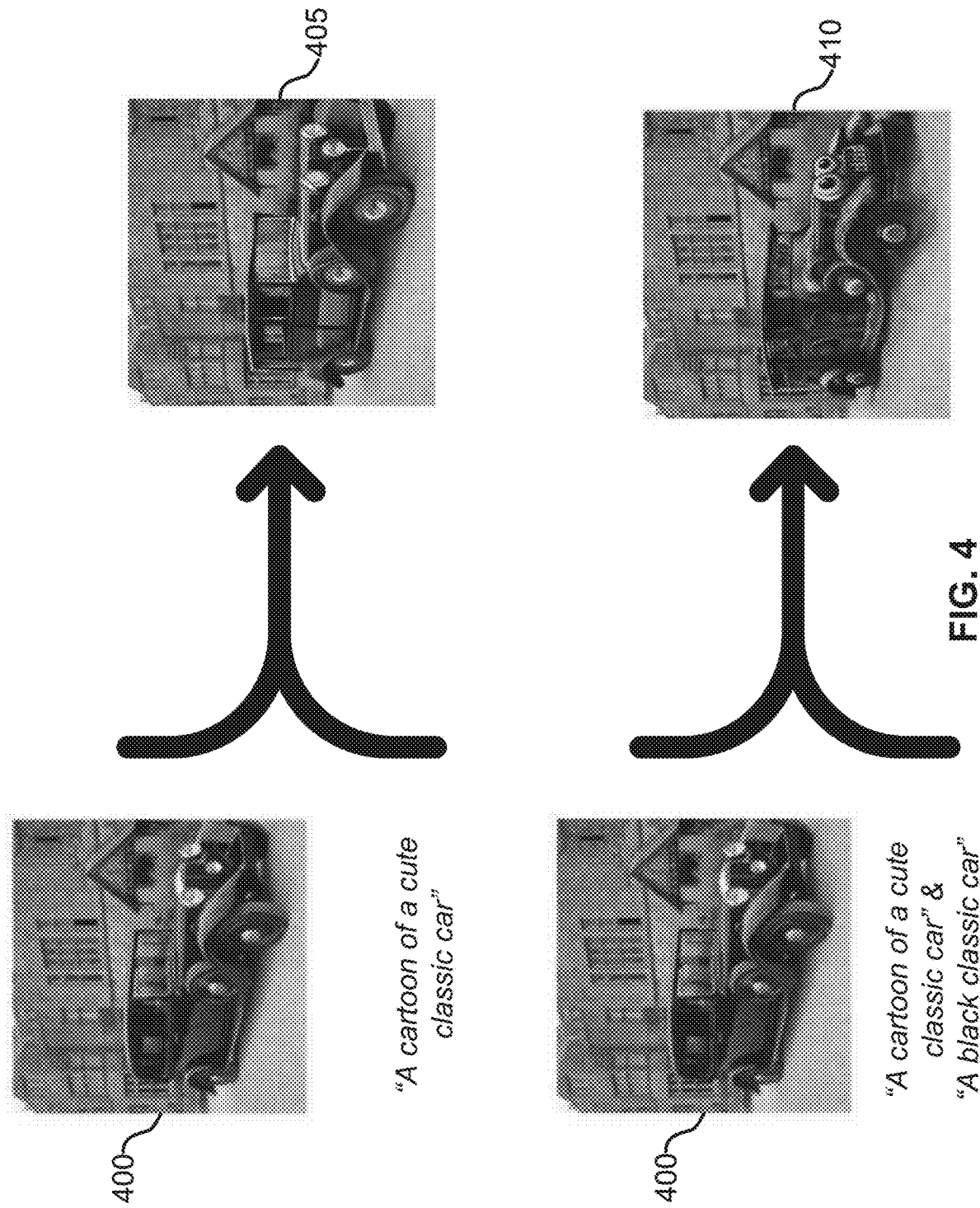
FIG. 4 shows a second example of a comparison of generated images according to aspects of the present disclosure.

FIG. 4 shows a second example of a comparison of generated images according to aspects of the present disclosure. The example shown includes original image 400, comparative image 405, and modified image 410. Original image 400 is an example of, or includes aspects of, the corresponding element described with reference to FIGS. 3, 8, and 9. Comparative image 405 is an example of, or includes aspects of, the corresponding element described with reference to FIGS. 3 and 8. Modified image 410 is an example of, or includes aspects of, the corresponding element described with reference to FIGS. 3 and 9.

FIG. 4 illustrates comparison between a modified image generated by an image generation system according to aspects of the present disclosure and a comparative image generated by a comparative image generation system. Referring to FIG. 4, the comparative image generation system receives original image 400 depicting a black classic car parked in a driveway in front of a house and a guidance text prompt including the words "A cartoon of a cute classic car" as input and uses a diffusion model to generate comparative image 405 in response. As shown in FIG. 4, comparative image 405 depicts a black classic car that has been modified from the car depicted in original image 400, but does not depict a car that is overtly "cartoon-like" and "cute" in appearance.

In contrast, an image generation system according to the present disclosure generates modified image 410 depicting a cute cartoon car based on original image 400, a target prompt including the words "A cartoon of a cute classic car", and an anchor prompt including the words "A black classic car". The anchor prompt describes the element of the original image that the target prompt intends to modify. Because a diffusion model of the image generation system computes modified image 410 based on the anchor prompt, the car depicted in modified image 410 is more reflective of the intended result of the target prompt (indicated by the prepositional phrase "a cartoon of" and the adjective "cute") and less reflective of the car depicted in original image 400. As shown in FIG. 4, it is apparent that modified image 410 is a more accurate representation of "A cartoon of a cute classic car" than comparative image 405.

Figure 5:
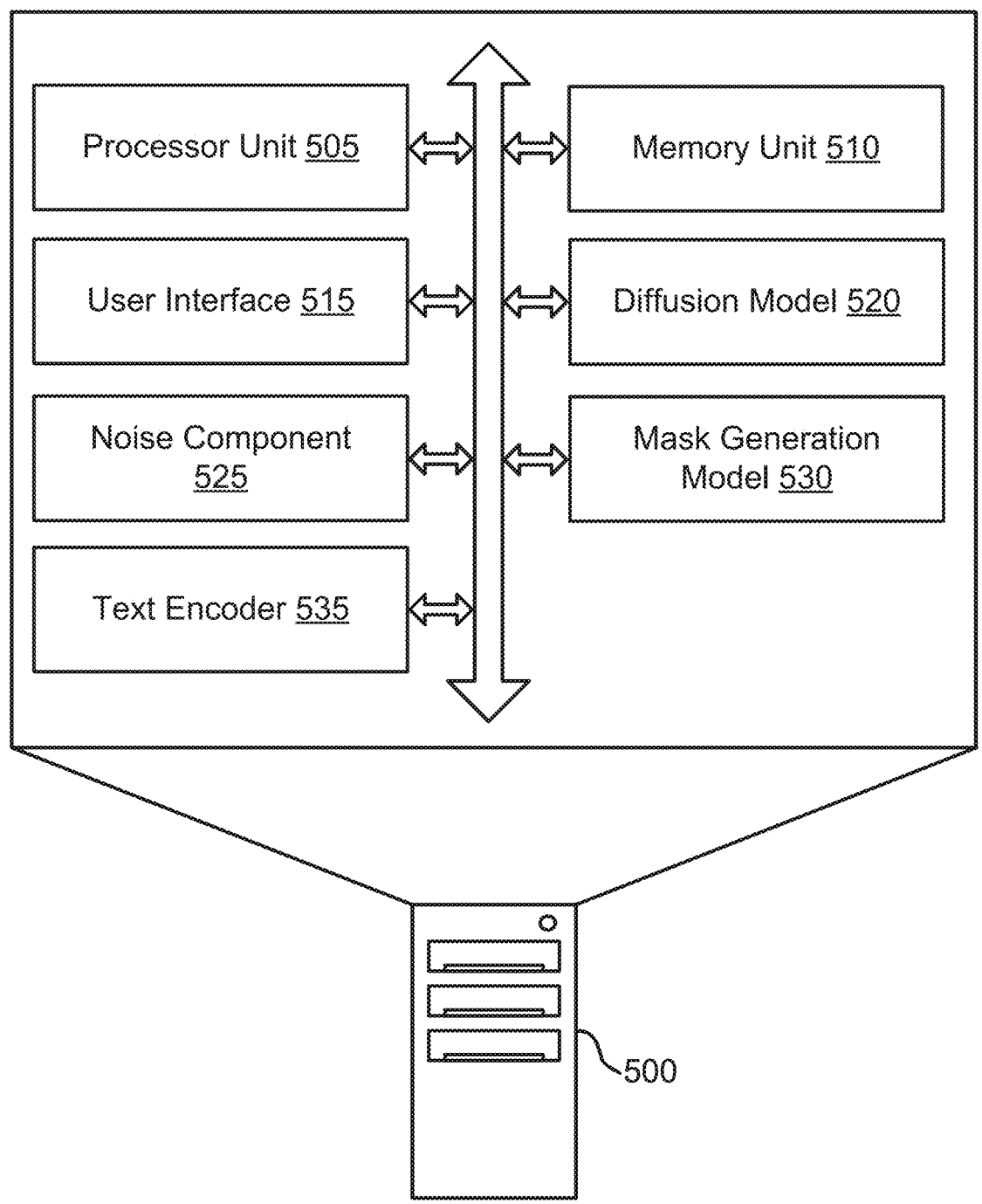
FIG. 5 shows an example of an image generation apparatus according to aspects of the present disclosure.

FIG. 5 shows an example of image generation apparatus 500 according to aspects of the present disclosure. Image generation apparatus 500 is an example of, or includes aspects of, the corresponding element described with reference to FIG. 1. In one aspect, image generation apparatus 500 includes processor unit 505, memory unit 510, user interface 515, diffusion model 520, noise component 525, mask generation model 530, and text encoder 535.

Image generation apparatus 500 is an example of, or includes aspects of, the computing device described with reference to FIG. 13. For example, in some cases, user interface 515, diffusion model 520, noise component 525, mask generation model 530, and text encoder 535, or a combination thereof are implemented as one or more hardware circuits that interact with components similar to the ones illustrated in FIG. 13 via a channel. For example, in some cases, user interface 515, diffusion model 520, noise component 525, mask generation model 530, and text encoder 535, or a combination thereof are implemented as software stored in a memory subsystem and executed by one or more processors described with reference to FIG. 13.

Processor unit 505 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 505 is configured to operate a memory array using a memory controller. In other cases, a memory controller is integrated into processor unit 505. In some cases, processor unit 505 is configured to execute computer-readable instructions stored in memory unit 510 to perform various functions. In some aspects, processor unit 505 includes special purpose components for modem processing, baseband processing, digital signal processing, or transmission processing. According to some aspects, processor unit 505 comprises the one or more processors described with reference to FIG. 13.

Memory unit 510 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 505 to perform various functions described herein. In some cases, memory unit 510 includes a basic input/output system (BIOS) that controls basic hardware or software operations, such as an interaction with peripheral components or devices. In some cases, memory unit 510 includes a memory controller that operates memory cells of memory unit 510. For example, the memory controller may include a row decoder, column decoder, or both. In some cases, memory cells within memory unit 510 store information in the form of a logical state. According to some aspects, memory unit 510 comprises the memory subsystem described with reference to FIG. 13.

According to some aspects, user interface 515 obtains an original image, an anchor prompt describing an element of the original image, and a target prompt describing a modification to the element of the original image. In some aspects, the anchor prompt includes a first modifier of the element and the target prompt includes a second modifier of the element, where the second modifier describes the modification to the element.

According to some aspects, user interface is implemented as software stored in memory unit 510 and executable by processor unit 505, as firmware, as one or more hardware circuits, or as a combination thereof.

According to some aspects, diffusion model 520 computes a first output based on the anchor prompt and a second output based on the target prompt. In some examples, diffusion model 520 computes a difference between the first output and the second output. In some examples, diffusion model 520 generates a modified image including the modification to the element of the original image based on the difference. In some examples, diffusion model 520 removes second noise from the noise image based on the difference to obtain the modified image. In some examples, diffusion model 520 computes a weighted sum of the first output and the difference, where the second noise is based on the weighted sum. In some examples, diffusion model 520 computes the difference at each of a set of noise removal steps for removing the second noise.

According to some aspects, diffusion model 520 includes one or more artificial neural networks (ANNs). An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Diffusion model 520 is an example of, or includes aspects of, the corresponding elements described with reference to FIGS. 6 and 9. In some aspects, diffusion model 520 comprises a pixel diffusion model. In some aspects, diffusion model 520 comprises a latent diffusion model. In some aspects, diffusion model 520 comprises a U-Net. According to some aspects, diffusion model 520 is implemented as software stored in memory unit 510 and executable by processor unit 505, as firmware, as one or more hardware circuits, or as a combination thereof.

According to some aspects, noise component 525 adds first noise to the original image to obtain a noise image. In some examples, noise component 525 generates a noise map based on the original image and the mask (i.e., layout information), where the modified image is generated based on the noise map.

According to some aspects, noise component 525 is configured to add first noise to the original image to obtain a noise image, wherein diffusion model 520 is further configured to remove second noise from the noise image based on the difference to obtain the modified image.

According to some aspects, noise component 525 is implemented as software stored in memory unit 510 and executable by processor unit 505, as firmware, as one or more hardware circuits, or as a combination thereof.

According to some aspects, mask generation model 530 obtains a mask indicating a region corresponding to the element of the original image, where the modified image is generated based on the mask. According to some aspects, mask generation model 530 is configured to generate a mask indicating a location of the element, wherein the modified image is generated based on the mask. For example, in some cases, mask generation model 530 comprises a Mask-R-CNN, a U-Net, or another ANN architecture configured to segment an image to obtain a segmentation mask (e.g., the mask).

A convolutional neural network (CNN) is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During a training process, the filters may be modified so that they activate when they detect a particular feature within the input.

A standard CNN may not be suitable when the length of the output layer is variable, i.e., when the number of the objects of interest is not fixed. Selecting a large number of regions to analyze using conventional CNN techniques may result in computational inefficiencies. Thus, in an R-CNN approach, a finite number of proposed regions are selected and analyzed.

A Mask R-CNN is a deep ANN that incorporates concepts of the R-CNN. Given an image as input, the Mask R-CNN provides object bounding boxes, classes, and masks (i.e., sets of pixels corresponding to object shapes). A Mask R-CNN operates in two stages, by generating potential regions (i.e., bounding boxes) where an object might be found and then identifying the class of the object, refining the bounding box, and generating a pixel-level mask in pixel level of the object. These stages may be connected using a backbone structure such as a feature pyramid network (FPN).

According to some aspects, mask generation model 530 is implemented as software stored in memory unit 510 and executable by processor unit 505, as firmware, as one or more hardware circuits, or as a combination thereof.

According to some aspects, text encoder 535 encodes the anchor prompt and the target prompt to obtain an encoded anchor prompt and an encoded target prompt, where the first output and the second output are based on the encoded anchor prompt and the encoded target prompt, respectively.

According to some aspects, text encoder 535 comprises one or more ANNs. For example, in some cases, text encoder 535 comprises a transformer, a Word2vec model, or a Contrastive Language-Image Pre-training (CLIP) model.

A transformer or transformer network is a type of ANN used for natural language processing tasks. A transformer network transforms one sequence into another sequence using an encoder and a decoder. The encoder and the decoder can include modules that can be stacked on top of each other multiple times. In some cases, the modules comprise multi-head attention and feed forward layers. In some cases, to the encoder inputs (e.g., target sentences) are embedded as vectors in an n-dimensional space. In some cases, positional encoding of different words (for example, an assignment for every word/part of a sequence to a relative position) are added to the embedded representation (e.g., the n-dimensional vector) of each word.

In some examples, a transformer network includes an attention mechanism, in which an importance of parts of an input sequence are iteratively determined. In some cases, the attention mechanism involves a query, keys, and values denoted by Q, K, and V, respectively. In some cases, Q represents a matrix that contains the query (e.g., a vector representation of one word in the sequence), K represents the keys (e.g., vector representations of all the words in the sequence), and V represents the values, (e.g., the vector representations of all the words in the sequence). In some cases, for the multi-head attention modules of the encoder and the decoder, V comprises a same word sequence as Q. However, for an attention module that takes into account the sequences for the encoder and the decoder, V is different from a sequence represented by Q. In some cases, values in V are multiplied and summed with attention weights.

In some cases, a Word2vec model comprises a two-layer ANN trained to reconstruct a context of terms in a document. In some cases, the Word2vec model takes a corpus of documents as input and produces a vector space as output. In some cases, the resulting vector space may comprise hundreds of dimensions, with each term in the corpus assigned a corresponding vector in the space. The distance between the vectors may be compared by taking the cosine between two vectors. In some cases, word vectors that share a common context in the corpus are located close to each other in the vector space.

In some cases, a CLIP model is an ANN that is trained to efficiently learn visual concepts from natural language supervision. CLIP can be instructed in natural language to perform a variety of classification benchmarks without directly optimizing for the benchmarks' performance, in a manner building on "zero-shot" or zero-data learning. CLIP can learn from unfiltered, highly varied, and highly noisy data, such as text paired with images found across the Internet, in a similar but more efficient manner to zero-shot learning, thus reducing the need for expensive and large labeled datasets. A CLIP model can be applied to nearly arbitrary visual classification tasks so that the model may predict the likelihood of a text description being paired with a particular image, removing the need for users to design their own classifiers and the need for task-specific training data. For example, a CLIP model can be applied to a new task by inputting names of the task's visual concepts to the model's text encoder. The model can then output a linear classifier of CLIP's visual representations.

According to some aspects, text encoder 535 is implemented as software stored in memory unit 510 and executable by processor unit 505, as firmware, as one or more hardware circuits, or as a combination thereof. In some embodiments, text encoder 535 is an example of, or includes aspects of, the text encoder described with reference to FIG. 6.

Figure 6:
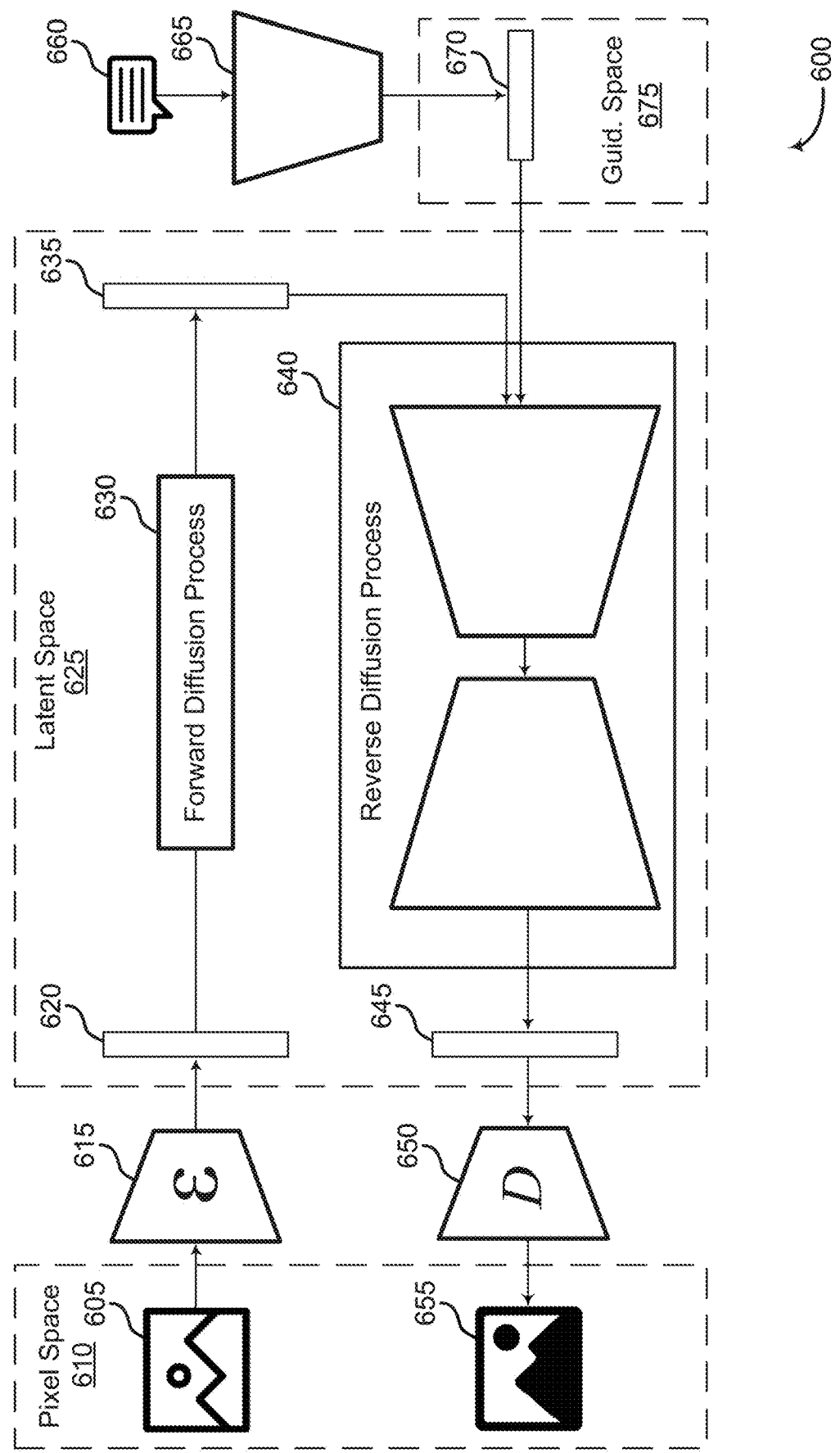
FIG. 6 shows an example of a guided diffusion architecture according to aspects of the present disclosure.

FIG. 6 shows an example of a guided latent diffusion architecture 600 according to aspects of the present disclosure. Diffusion models are a class of generative ANNs that can be trained to generate new data with features similar to features found in training data. In particular, diffusion models can be used to generate novel images. Diffusion models can be used for various image generation tasks, including image super-resolution, generation of images with perceptual metrics, conditional generation (e.g., generation based on text guidance), image inpainting, and image manipulation.

Diffusion models function by iteratively adding noise to data during a forward diffusion process and then learning to recover the data by denoising the data during a reverse diffusion process. Examples of diffusion models include Denoising Diffusion Probabilistic Models (DDPMs) and Denoising Diffusion Implicit Models (DDIMs). In DDPMs, a generative process includes reversing a stochastic Markov diffusion process. On the other hand, DDIMs use a deterministic process so that a same input results in a same output. Diffusion models may also be characterized by whether noise is added to an image itself, or to image features generated by an encoder, as in latent diffusion.

For example, according to some aspects, image encoder 615 encodes original image 605 from pixel space 610 and generates original image features 620 in latent space 625. Original image 605 is an example of, or includes aspects of, the original image described with reference to FIGS. 3, 4, 8, and 9. According to some aspects, image encoder 615 is included in an image generation apparatus as described with reference to FIG. 5. According to some aspects, image encoder 615 is included in a noise component as described with reference to FIG. 5.

According to some aspects, forward diffusion process 630 gradually adds noise to original image features 620 to obtain noisy features 635 (also in latent space 625) at various noise levels. In some cases, forward diffusion process 630 is implemented as the forward diffusion process described with reference to FIGS. 10 and 11. In some cases, forward diffusion process 630 is implemented by a noise component described with reference to FIG. 5. In some cases, noisy features 635 are examples of, or include aspects of the first noise and/or the noise map described with reference to FIG. 10.

According to some aspects, reverse diffusion process 640 is applied to noisy features 635 to gradually remove the noise from noisy features 635 at the various noise levels to obtain denoised image features 645 in latent space 625. In some cases, denoised features 645 are an example of, or include aspects of, the second noise described with reference to FIG. 10. In some cases, reverse diffusion process 640 is implemented as the reverse diffusion process described with reference to FIGS. 9, 10, and 11. In some cases, reverse diffusion process 640 is implemented by a diffusion model described with reference to FIGS. 5 and 9.

In some cases, the diffusion model is a latent diffusion model. In some cases, reverse diffusion process 640 is implemented by a U-Net ANN described with reference to FIG. 7 included in the diffusion model.

According to some aspects, a training component compares denoised image features 645 to original image features 620 at each of the various noise levels, and updates parameters of the diffusion model according to a mapping function F based on the comparison. In some cases, image decoder 650 decodes denoised image features 645 to obtain output image 655 in pixel space 610. In some cases, an output image 655 is created at each of the various noise levels. In some cases, the training component compares output image 655 to original image 605 to train the diffusion model as described with reference to FIG. 12. According to some aspects, image decoder 650 is included in an image generation apparatus as described with reference to FIG. 5. According to some aspects, image decoder 650 is included in a diffusion model as described with reference to FIGS. 5 and 9. In some cases, output image 655 is an example of, or includes aspects of, a modified image as described with reference to FIGS. 3, 4, and 9.

In some cases, image encoder 615 and image decoder 650 are pretrained prior to training the diffusion model. In some examples, image encoder 615, image decoder 650, and the diffusion model are jointly trained. In some cases, image encoder 615 and image decoder 650 are jointly fine-tuned with the diffusion model.

According to some aspects, reverse diffusion process 640 is also guided based on a guidance prompt such as text prompt 660 (e.g., a target prompt and/or an anchor prompt as described with reference to FIGS. 1-4 and 9-11), a mask (e.g., a mask as described with reference to FIGS. 9 and 10), a layout, a segmentation map, etc. In some cases, text prompt 660 is encoded using text encoder 665 (e.g., a multimodal encoder) to obtain guidance features 670 in guidance space 675. In some cases, guidance features 670 are combined with noisy features 635 at one or more layers of reverse diffusion process 640 to ensure that output image 655 includes content described by text prompt 660. For example, guidance features 670 can be combined with noisy features 635 using a cross-attention block within reverse diffusion process 640. According to some aspects, text encoder 665 is an example of, or includes aspects of, the text encoder described with reference to FIG. 5.

In the machine learning field, an attention mechanism is a method of placing differing levels of importance on different elements of an input. Calculating attention may involve three basic steps. First, a similarity between query and key vectors obtained from the input is computed to generate attention weights. Similarity functions used for this process can include dot product, splice, detector, and the like. Next, a softmax function is used to normalize the attention weights. Finally, the attention weights are weighed together with their corresponding values.

Although FIG. 6 illustrates a latent diffusion architecture, according to aspects of the present disclosure, the diffusion architecture may also be implemented in pixel space, in which an input image is noised and denoised in a pixel space rather than a latent space to obtain an output as described above.

Figure 7:
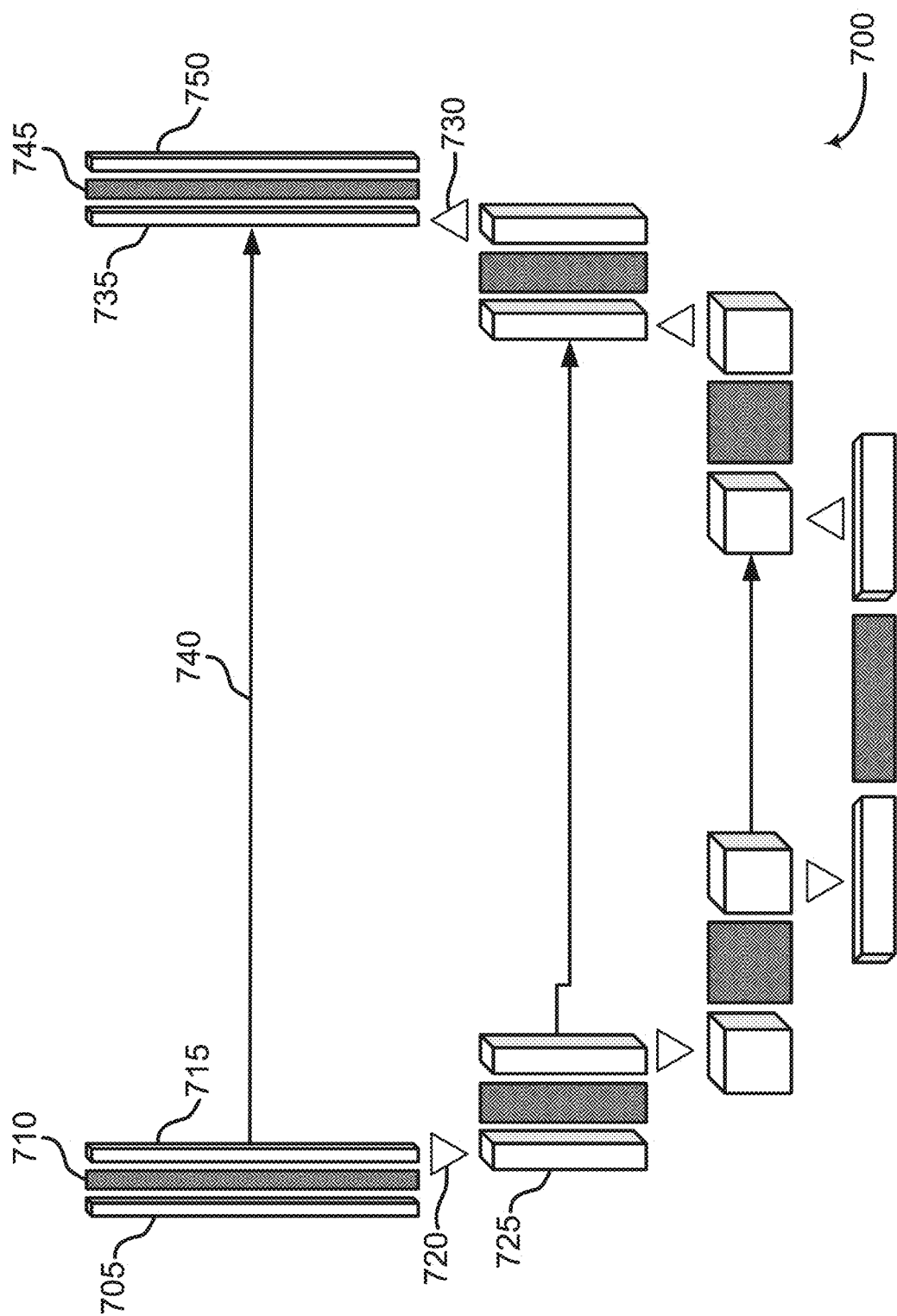
FIG. 7 shows an example of a U-Net according to aspects of the present disclosure.

FIG. 7 shows an example of a U-Net 700 according to aspects of the present disclosure. According to some aspects, a diffusion model (such as the diffusion model described with reference to FIGS. 5, 6, and 9) is based on an ANN architecture known as a U-Net. According to some aspects, U-Net 700 receives input features 705, where input features 705 include an initial resolution and an initial number of channels, and processes input features 705 using an initial neural network layer 710 (e.g., a convolutional network layer) to produce intermediate features 715.

In some cases, intermediate features 715 are then downsampled using a down-sampling layer 720 such that down-sampled features 725 have a resolution less than the initial resolution and a number of channels greater than the initial number of channels.

In some cases, this process is repeated multiple times, and then the process is reversed. For example, down-sampled features 725 are up-sampled using up-sampling process 730 to obtain up-sampled features 735. In some cases, up-sampled features 735 are combined with intermediate features 715 having a same resolution and number of channels via skip connection 740. In some cases, the combination of intermediate features 715 and up-sampled features 735 are processed using final neural network layer 745 to produce output features 750. In some cases, output features 750 have the same resolution as the initial resolution and the same number of channels as the initial number of channels.

According to some aspects, U-Net 700 receives additional input features to produce a conditionally generated output. In some cases, the additional input features include a vector representation of an input prompt. In some cases, the additional input features are combined with intermediate features 715 within U-Net 700 at one or more layers. For example, in some cases, a cross-attention module is used to combine the additional input features and intermediate features 715.

U-Net 700 is an example of, or includes aspects of, a U-Net included in the diffusion model described with reference to FIGS. 5, 6, and 9. In some cases, U-Net 700 implements the reverse diffusion process described with reference to FIGS. 9, 10, and 11.

Figure 8:
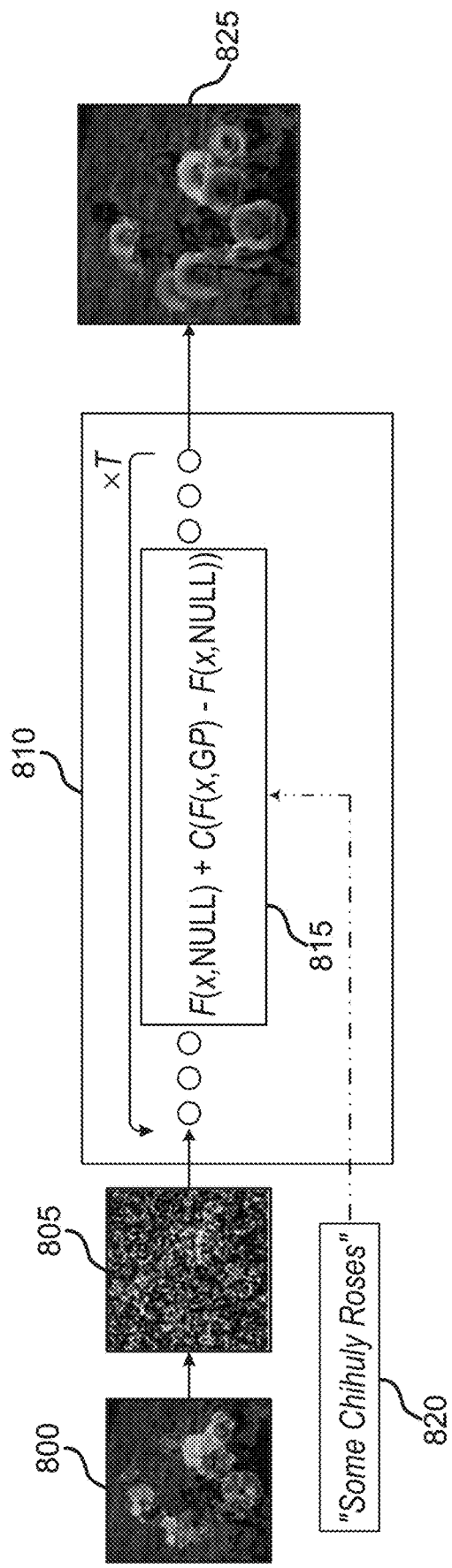
FIG. 8 shows an example of data flow in a comparative image generation apparatus.

FIG. 8 shows an example of data flow in a comparative image generation apparatus. The example shown includes original image 800, noise image 805, comparative diffusion model 810, classifier-free guidance update rule 815, guidance prompt 820, and comparative output image 825. Original image 800 is an example of, or includes aspects of, the corresponding element described with reference to FIGS. 3 and 4. Comparative output image 825 is an example of or includes aspects of the corresponding element described with reference to FIGS. 3 and 4.

Referring to FIG. 8, a majority of computation and parameters in a comparative diffusion model take part in a mapping function F that reduces noise at each timestep of a comparative reverse diffusion process according to classifier-free guidance update rule 815. For example, comparative diffusion model 810 takes as input a sample x based on noise image 805 (e.g., a noisy or partially denoised image based on original image 800 depending on the timestep), the timestep t (omitted in FIG. 8 for simplicity), and any conditioning information comparative diffusion model 810 was trained to utilize. In some conventional cases, classifier-free guidance is a mechanism to vary and control an influence of the conditioning on a sampled distribution at inference. During training, the conditioning is frequently replaced by a NULL token (e.g., an empty text string). Then, during inference, a single scalar (denoted as C in FIG. 8) can control the effect of the conditioning in the mapping function: $F(x, NULL)+C(F(x, GP)-F(x, NULL))$, where GP indicates guidance prompt 820, to produce comparative output image 825.

For example, when C is equal to 0, sampling is unconditional, when C is equal to 1, comparative diffusion model 810 operates in a same regime used during training, and when C is greater than 1, the conditioning has a stronger influence than during training. The classifier-free update rule treats $F(x, NULL)$ as the origin, and pushes the update in the direction $F(x, GP)-F(x, NULL)$.

Figure 9:
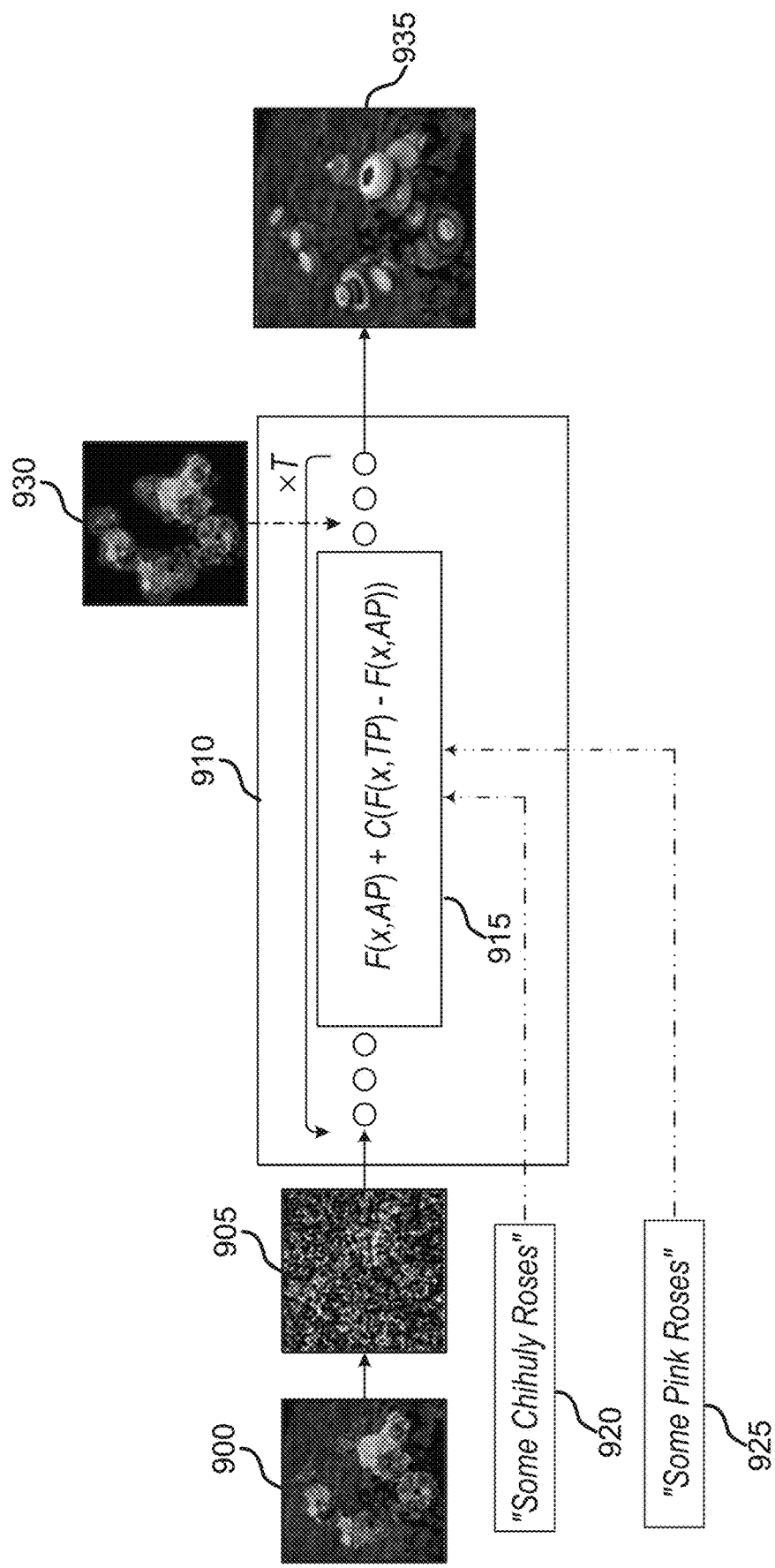
FIG. 9 shows an example of data flow in an image generation apparatus according to aspects of the present disclosure.

FIG. 9 shows an example of data flow in a comparative image generation apparatus. The example shown includes original image 900, noise image 905, diffusion model 910, anchored classifier-free guidance update rule 915, target prompt 920, anchor prompt 925, mask 930, and modified image 935.

Original image 900 is an example of, or includes aspects of, the corresponding element described with reference to FIGS. 3, 4, and 8. Diffusion model 910 is an example of, or includes aspects of, the corresponding element described with reference to FIGS. 5 and 6. Modified image 935 is an example of or includes aspects of the corresponding element described with reference to FIGS. 3 and 4.

Referring to FIG. 9, according to some aspects, a noise component as described with reference to FIG. 5 obtains noise image 905 based on original image 900 in a forward diffusion process as described with reference to FIGS. 6 and 10-11. Noise image 905 is provided to diffusion model 910. According to some aspects, diffusion model 910 gradually removes noise from noise image 905 according to anchored classifier-free guidance update rule 915 based on target prompt 920 and anchor prompt 925. In some cases, diffusion model 910 removes the noise from noise image 905 based on mask 930. Diffusion model 910 outputs modified image 935 after noise image 905 (and succeeding intermediate noise images) are fully denoised according to parameters of diffusion model 910.

Referring to FIGS. 8 and 9, while comparative diffusion model 810 implements a mapping function F according to a classifier-free guidance update rule 815, according to some aspects, diffusion model 910 implements a mapping function F according to an anchored classifier-free guidance update rule 915: $F(x,AP)+C(F(x,TP)-F(x,AP))$, where TP indicates target prompt 920 that describes a modification to an element of original image 900, and AP indicates anchor prompt 925 that describes the element of original image 900.

For example, diffusion model 910 takes as input a sample x based on noise image 905 (e.g., a noisy or partially denoised image depending on the timestep based on original image 900), the timestep t (omitted in FIG. 9 for simplicity), and conditioning information diffusion model 910 is trained to utilize. According to some aspects, scalar C can control the effect of the conditioning in the mapping function F to produce modified output image 935.

For example, when C is equal to 0, sampling is unconditional, when C is equal to 1, diffusion model 910 operates in a same regime used during training, and when C is greater than 1, the conditioning has a stronger influence than during training. Anchored classifier-free guidance update rule 915 treats $F(x,AP)$ as the origin, and pushes the update in the direction $F(x,TP)-F(x,AP)$.

Referring to FIGS. 8 and 9, it is apparent that modified image 935 output by diffusion model 910 is a more accurate representation of target prompt 920 (e.g., "Some Chihuly Roses") than comparative output image 825 is of guidance prompt 820 (also "Some Chihuly Roses"). According to some aspects, this is a result of the use of anchor prompt 925 (e.g., "Some Pink Roses") that describes an element of original image 900 in anchored classifier-free guidance update rule 915.

Image Generation

A method for image generation is described with reference to FIGS. 10-11. One or more aspects of the method include obtaining an original image, an anchor prompt describing an element of the original image, and a target prompt describing a modification to the element of the original image; computing a first output based on the anchor prompt and a second output based on the target prompt using a diffusion model; computing a difference between the first output and the second output; and generating a modified image including the modification to the element of the original image based on the difference.

In some aspects, the anchor prompt includes a first modifier of the element and the target prompt includes a second modifier of the element, wherein the second modifier describes the modification to the element.

Some examples of the method further include adding first noise to the original image to obtain a noise image. Some examples further include removing second noise from the noise image based on the difference to obtain the modified image.

Some examples of the method further include computing a weighted sum of the first output and the difference, wherein the second noise is based on the weighted sum. Some examples of the method further include determining a number of noise addition steps for adding the first noise. Some examples further include computing the difference at each of a plurality of noise removal steps for removing the second noise.

Some examples of the method further include obtaining a mask indicating a region corresponding to the element of the original image, wherein the modified image is generated based on the mask. Some examples of the method further include generating a noise map based on the original image and the mask, wherein the modified image is generated based on the noise map.

Some examples of the method further include encoding the anchor prompt and the target prompt using a text encoder to obtain an encoded anchor prompt and an encoded target prompt, wherein the first output and the second output are based on the encoded anchor prompt and the encoded target prompt, respectively.

Figure 10:
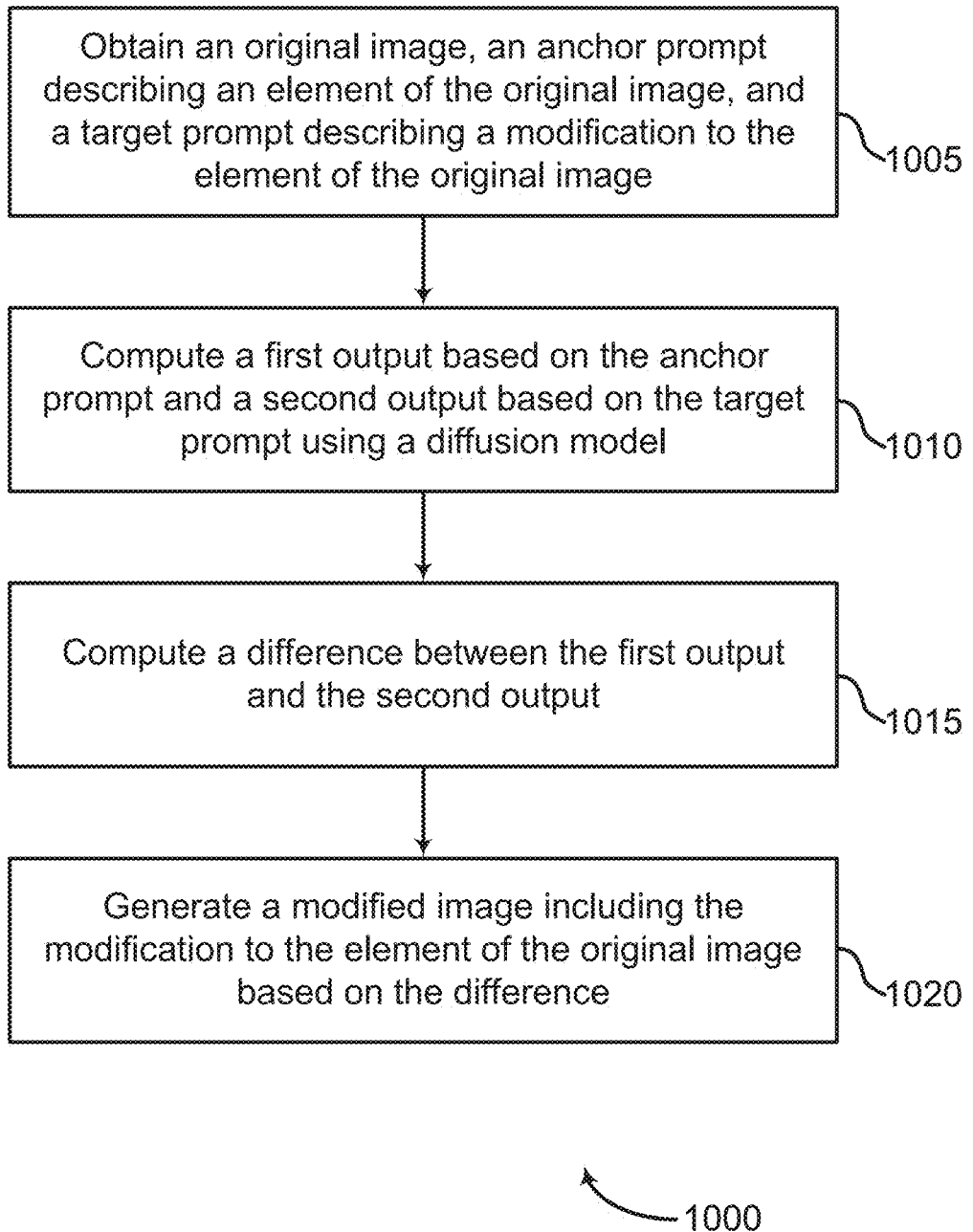
FIG. 10 shows an example of a method for generating a modified image according to aspects of the present disclosure.

FIG. 10 shows an example of a method 1000 for generating a modified image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 10, according to some aspects, an image generation system generates, using a diffusion model, a modified image based on an original image, an anchor prompt describing an element of the original image, and a target prompt describing a modification of the original image. By generating the modified image based on the anchor prompt describing the element of the image and a target prompt describing the modification to the element, the image generation system is able to produce a modified image that is a more accurate depiction of the target prompt than conventional image generation systems can provide based on a guidance prompt.

At operation 1005, the system obtains an original image, an anchor prompt describing an element of the original image, and a target prompt describing a modification to the element of the original image. In some cases, the operations of this step refer to, or may be performed by, a user interface as described with reference to FIG. 5.

For example, in some cases, a user (such as the user described with reference to FIG. 1) provides the original image, the anchor prompt, and the target prompt to the user interface via a user device (such as the user device described with reference to FIG. 1). In some cases, the user interface is provided by the image generation apparatus via the user device. In some cases, the user interface retrieves the original image, the anchor prompt, the target prompt, or a combination thereof from a database (such as the database described with reference to FIG. 1).

According to some aspects, the anchor prompt includes a first modifier of the element and the target prompt includes a second modifier of the element, wherein the second modifier describes the modification to the element. For example, where the anchor prompt and/or the target prompt is a text prompt, the "modifier" can include an adjective, prepositional phrase, etc. that corresponds to the element as represented in the anchor prompt and/or the target prompt (for example, as a noun).

According to some aspects, the user interface provides the anchor prompt and the target prompt to the diffusion model. According to some aspects, the user interface provides the anchor prompt and the target prompt to a text encoder as described with reference to FIG. 5. In some embodiments, the text encoder encodes the anchor prompt and the target prompt to obtain an encoded anchor prompt and an encoded target prompt, respectively.

At operation 1010, the system computes a first output based on the anchor prompt and a second output based on the target prompt using a diffusion model. In some cases, the operations of this step refer to, or may be performed by, a diffusion model as described with reference to FIGS. 5, 6, and 9.

According to some aspects, the diffusion model determines a first output F(x,AP) based on the anchor prompt AP or the encoded anchor prompt AP, where the first output F(x,AP) is a portion of a mapping function F according to an anchored classifier-free guidance update rule as described with reference to FIG. 9, and x is a sample (such as a noise image or a partially noise image) at a time step t of a reverse diffusion process implemented by the diffusion model (such as the reverse diffusion process described with reference to FIG. 11).

According to some aspects, the diffusion model determines a second output F(x,TP) based on the target prompt TP or the encoded target prompt TP, where the second output F(x,TP) is a portion of the mapping function F according to the anchored classifier-free guidance update rule as described with reference to FIG. 9, and x is the sample (such as the noise image or the partially noise image) at the time step t of the reverse diffusion process implemented by the diffusion model (such as the reverse diffusion process described with reference to FIG. 11).

At operation 1015, the system computes a difference between the first output and the second output. In some cases, the operations of this step refer to, or may be performed by, a diffusion model as described with reference to FIGS. 5, 6, and 9.

According to some aspects, the diffusion model determines a difference between the first output and the second output as described with reference to FIG. 9: F(x, TP)−F(x, AP). According to some aspects, the diffusion model computes a weighted sum of the first output and the difference: F(x, AP)+C(F(x, TP)−F(x, AP)), where C is a scalar as described with reference to FIG. 9. In some embodiments, the mapping function F comprises the weighted sum of the first output and the difference.

At operation 1020, the system generates a modified image including the modification to the element of the original image based on the difference. In some cases, the operations of this step refer to, or may be performed by, a diffusion model as described with reference to FIGS. 5, 6, and 9.

According to some aspects, the user interface provides the original image to a noise component. In some cases, the noise component adds first noise to the original image via a forward diffusion process to obtain a noise image as described with reference to FIG. 11. In some embodiments, the noise component provides the noise image to the diffusion model. In some embodiments, the noise component determines a number of noise addition steps for adding the first noise as described with reference to FIG. 11.

According to some aspects, the diffusion model removes second noise from the noise image based on the difference to obtain the modified image. For example, the diffusion model gradually removes noise from the noise image in a series of steps of a reverse diffusion process based on the difference to obtain the modified image as described with reference to FIG. 11. In some embodiments, the second noise is based on the weighted sum. In some embodiments, the diffusion model computes the difference at each of a plurality of noise removal steps for removing the second noise as described with reference to FIG. 11.

According to some aspects, a mask generation model obtains a mask indicating a region corresponding to the element of the original image. In some embodiments, a user provides the mask to the mask generation model via the user interface. In some embodiments, the mask generation model generates the mask based on input from the user provided to the user interface. In some embodiments, the mask generation model generates the mask based on the image.

According to some aspects, the modified image is generated based on the mask. For example, in some embodiments, the mask generation model provides the mask to the noise component and/or to the diffusion model. In some embodiments, the noise component adds the first noise to a region corresponding to the element of the original image based on the mask. For example, the noise component generates a noise map including the first noise based on the original image and the mask, where the modified image is generated based on the noise map. In some embodiments, the diffusion model removes the second noise from a region corresponding to the element of the original image in the noise image based on the mask, thereby localizing the modification to the element in the modified image.

Figure 11:
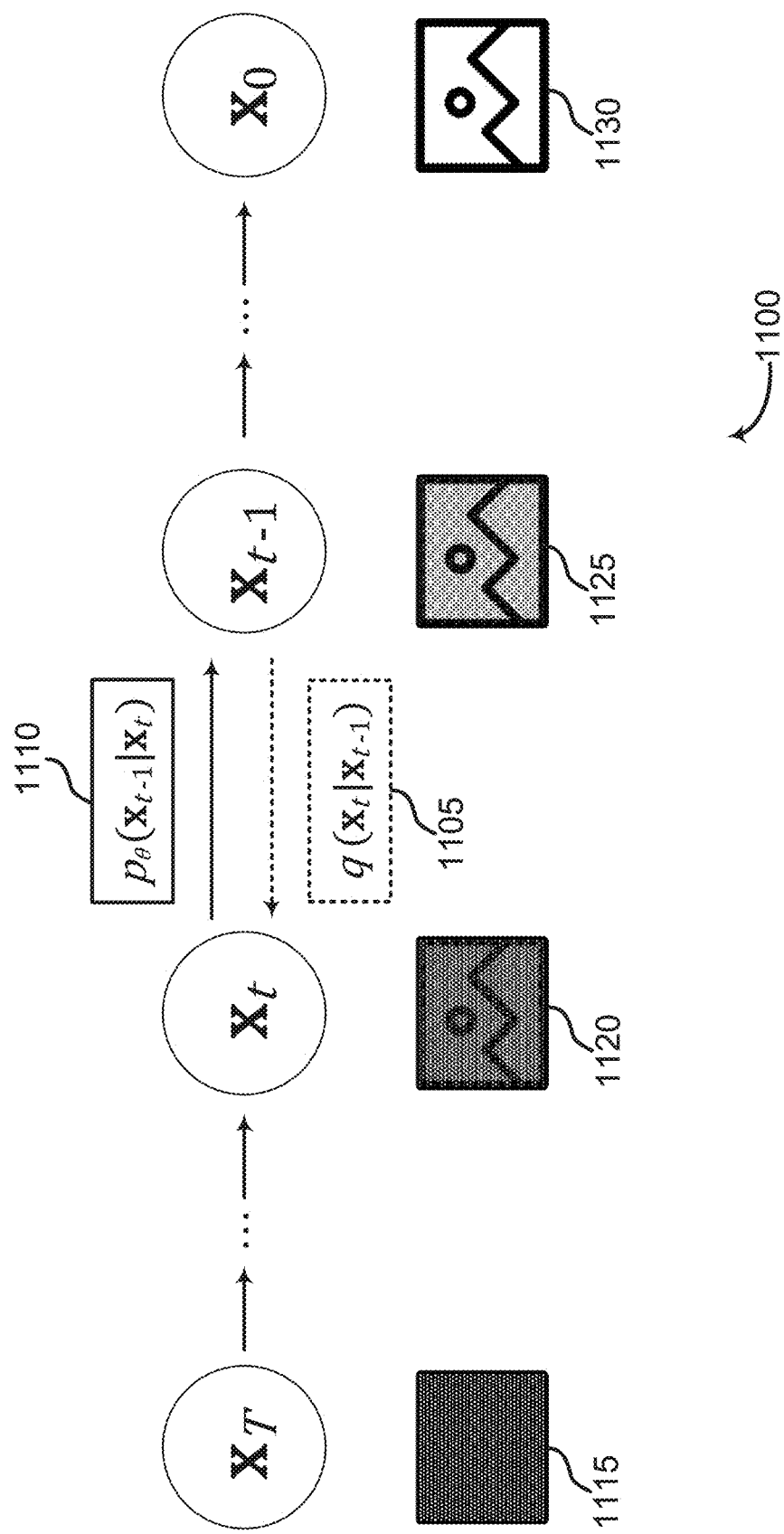
FIG. 11 shows an example of diffusion processes according to aspects of the present disclosure.

FIG. 11 shows an example of diffusion processes 1100 according to aspects of the present disclosure. The example shown includes forward diffusion process 1105 and reverse diffusion process 1110. In some cases, forward diffusion process 1105 adds first noise to an image (or image features in a latent space) to obtain a noise image (or noise image features). In some cases, reverse diffusion process 1110 removes second noise from the noise image (or noise image features in the latent space) to obtain a modified image.

According to some aspects, a noise component as described with reference to FIG. 5 uses forward diffusion process 1105 to iteratively add Gaussian noise (e.g., first noise) to an original image at each diffusion step t according to a known variance schedule $0<\beta_1<\beta_2<\ldots<\beta_T<1$:

$$q(x_t|x_{t-1}) = \mathcal{N}(x_t; \sqrt{1-\beta_t}x_{t-1}, \beta_t I) \qquad (1)$$

According to some aspects, the Gaussian noise is drawn from a Gaussian distribution with mean $\mu_t = \sqrt{1-\beta_t}x_{t-1}$ and variance $\sigma^2 = \beta_t \geq 1$ by sampling $\epsilon \sim N(0, I)$ and setting $x_t = \sqrt{1-\beta_t}x_{t-1} + \sqrt{\beta_t}\epsilon$. Accordingly, beginning with an initial input $x_0$ (e.g., an original image), forward diffusion process 1105 produces $x_1, \ldots, x_t, \ldots X_T$, where $X_T$ is pure Gaussian noise (e.g., a noise image).

For example, in some cases, a noise component described with reference to FIG. 5 maps an observed variable $x_0$ in either a pixel space or a latent space to intermediate variables $x_1, \ldots X_T$ using a Markov chain, where the intermediate variables $x_1, \ldots, X_T$ have a same dimensionality as the observed variable $x_0$. In some cases, the Markov chain gradually adds Gaussian noise to the observed variable $x_0$ or to the intermediate variables $x_1, \ldots, X_T$, respectively, as the variables are passed through a neural network such as a U-Net to obtain an approximate posterior $q(x_{1:T}|x_0)$.

According to some aspects, during reverse diffusion process 1110, a diffusion model such as the diffusion model described with reference to FIGS. 5, 6, and 9 gradually removes second noise (e.g., noise present in each sample x at each reverse diffusion step t) from noise image $X_T$ to obtain a prediction of the observed variable $x_0$ (e.g., a representation of what the diffusion model thinks modified image 1130 should be based on the mapping function F described with reference to FIG. 9). A conditional distribution $p(x_{t-1}|x_t)$ of the observed variable $x_0$ is unknown to the diffusion model, however, as calculating the conditional distribution would require a knowledge of a distribution of all possible images. Accordingly, the diffusion model is trained to iteratively approximate (e.g., learn) a conditional probability distribution $p_\theta(x_{t-1}|x_t)$ of the conditional distribution $p(x_{t-1}|x_t)$ according to the mapping function F:

$$p_\theta(x_{t-1}|x_t) = \mathcal{N}(x_{t-1};\mu_\theta(x_t,t),\Sigma_\theta(x_t,t)) \quad (2)$$

In some cases, a mean of the conditional probability distribution $p_\theta(x_{t-1}|x_t)$ is parameterized by $\mu_\theta$ and a variance of the conditional probability distribution $p_\theta(x_{t-1}|x_t)$ is parameterized by $\Sigma_\theta$. In some cases, the mean and the variance are conditioned on a noise level t (e.g., an amount of noise corresponding to a diffusion step t). According to some aspects, the diffusion model is trained to learn the mean and/or the variance.

According to some aspects, the diffusion model initiates reverse diffusion process 1110 with noisy data $x_T$ (such as noise image 1115). According to some aspects, the diffusion model iteratively denoises the noisy data $x_T$ to obtain the conditional probability distribution $p_\theta(x_{t-1}|x_t)$. For example, in some cases, at each step t-1 of reverse diffusion process 1110, the diffusion model takes $x_t$ (such as first intermediate image 1120) and t as input, where t represents a step in a sequence of transitions associated with different noise levels, and iteratively outputs a prediction of $x_{t-1}$ (such as second intermediate image 1125) until the noisy data $x_T$ is reverted to a prediction of the observed variable $x_0$ (e.g., modified image 1130).

In some cases, at each reverse diffusion step t, the diffusion model predicts the intermediate diffusion maps based on the target prompt, the anchor prompt, a mask, or a combination thereof as described with reference to FIG. 9.

According to some aspects, a joint probability of a sequence of samples in the Markov chain is determined as a product of conditionals and a marginal probability:

$$x_T : p_\theta(x_{0:T}) := p(x_T)\Pi_{t=1}^T p_\theta(x_{t-1}|x_t) \quad (3)$$

In some cases, $p(x_T) = \mathcal{N}(x_T; 0, I)$ is a pure noise distribution, as reverse diffusion process 1110 takes an outcome of forward diffusion process 1105 (e.g., a sample of pure noise $x_T$) as input, and $\Pi_{t=1}^T p_\theta(x_{t-1}|x_t)$ represents a sequence of Gaussian transitions corresponding to a sequence of addition of Gaussian noise to a sample.

Training

Figure 12:
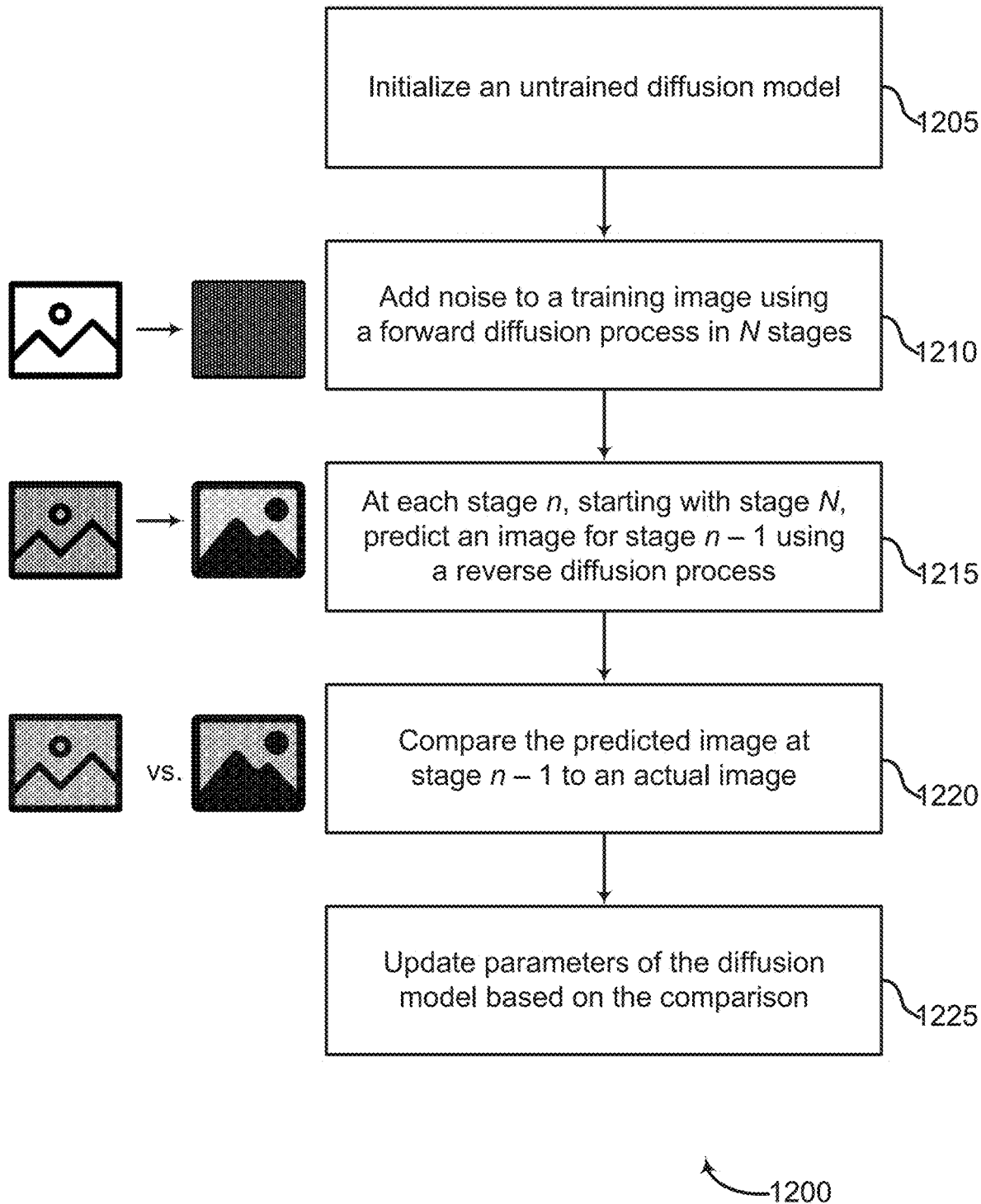
FIG. 12 shows an example of a method for training a diffusion model according to aspects of the present disclosure.

FIG. 12 shows an example of a method 1200 for training a diffusion model via forward and reverse diffusion according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 12, the system trains an untrained diffusion model to implement the trained diffusion model as the diffusion model described with reference to FIGS. 5, 6, and 9.

At operation 1205, the system initializes an untrained diffusion model. In some cases, the operations of this step refer to, or may be performed by, a training component. According to some aspects, the training component is included in the image generation apparatus described with reference to FIG. 5. According to some aspects, the training component is included in a separate apparatus.

In some cases, the initialization includes defining the architecture of the untrained diffusion model and establishing initial values for parameters of the untrained diffusion model. In some cases, the training component initializes the untrained diffusion model to implement a U-Net architecture described with reference to FIG. 7. In some cases, the initialization includes defining hyper-parameters of the architecture of the untrained diffusion model, such as a number of layers, a resolution and channels of each layer block, a location of skip connections, and the like.

At operation 1210, the system adds noise to a training image using a forward diffusion process in N stages. In some cases, the operations of this step refer to, or may be performed by, the training component. In some cases, the training component retrieves image caption training data from a database, such as the database described with reference to FIG. 1. In some cases, the training component adds noise to a training image included in the image caption training data using a forward diffusion process described with reference to FIGS. 6, 10, and 11.

At operation 1215, at each stage n, starting with stage N, the system predicts an image for stage n-1 using a reverse diffusion process. In some cases, the operations of this step refer to, or may be performed by, the untrained diffusion model. According to some aspects, the untrained diffusion model performs a reverse diffusion process as described with reference to FIGS. 6, 10, and 11, where each stage n corresponds to a diffusion step t, to predict noise that was added by the forward diffusion process. In some cases, at each stage, the untrained diffusion model predicts noise that can be removed from an intermediate image to obtain the predicted image. In some cases, an original image is predicted at each stage of the training process.

At operation 1220, the system compares the predicted image at stage n-1 to an actual image (or image features), such as the image at stage n-1 or the original input image. In some cases, the operations of this step refer to, or may be performed by, the training component. For example, given observed data x, the training component trains the untrained diffusion model to minimize a variational upper bound of a negative log-likelihood $-\log p_\theta(x)$ of the image caption training data.

At operation 1225, the system updates parameters of the untrained diffusion model based on the comparison. In some cases, the operations of this step refer to, or may be performed by, the training component. For example, in some cases, the training component updates parameters of the U-Net using gradient descent. In some cases, the training component trains the U-Net to learn time-dependent parameters of the Gaussian transitions. Accordingly, by updating parameters of the untrained diffusion model, the training component obtains a trained diffusion model.

Figure 13:
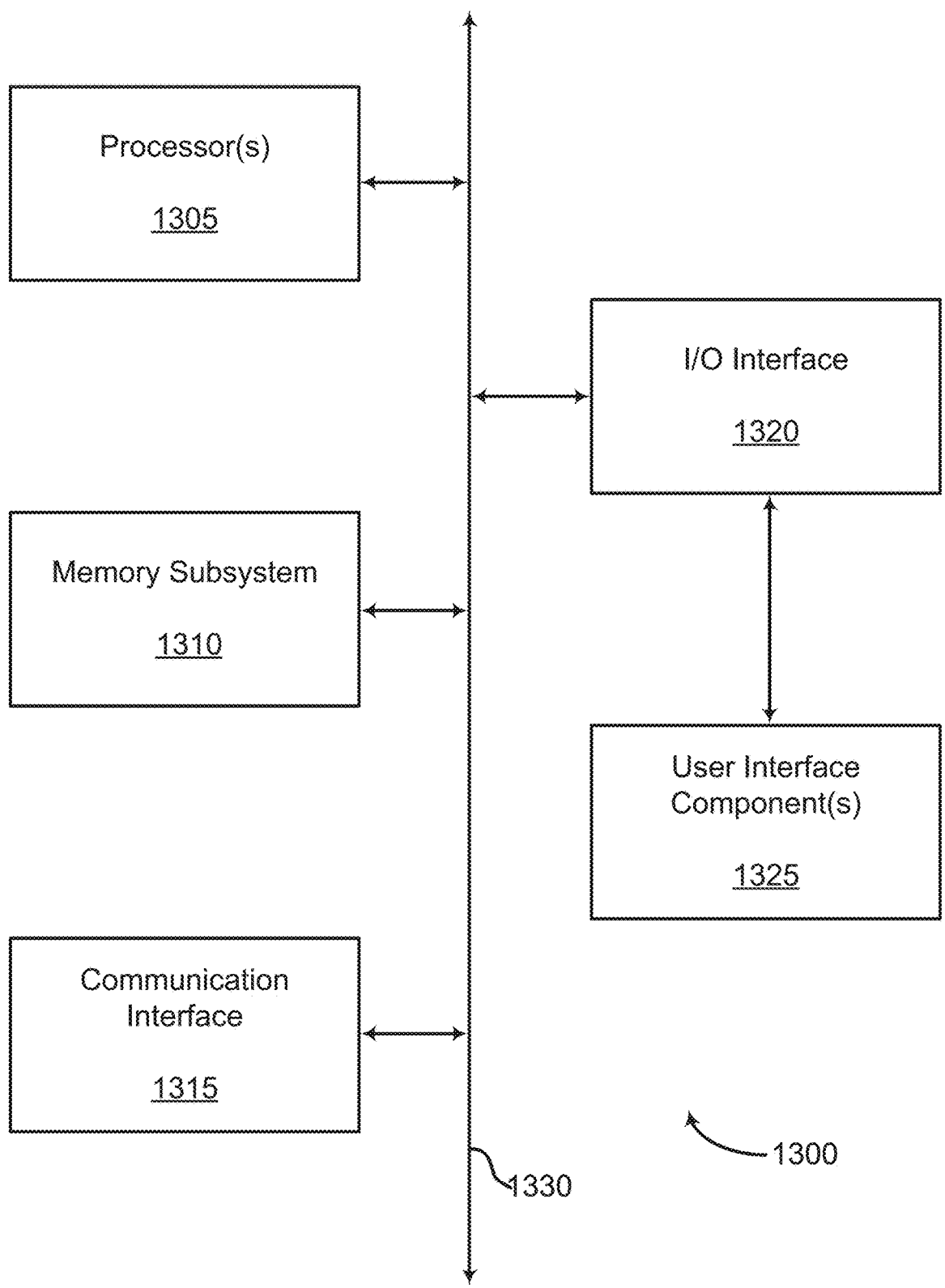
FIG. 13 shows an example of a computing device figure according to aspects of the present disclosure.

FIG. 13 shows an example of a computing device 1300 for image generation according to aspects of the present disclosure. In one aspect, computing device 1300 includes processor(s) 1305, memory subsystem 1310, communication interface 1315, I/O interface 1320, user interface component(s) 1325, and channel 1330.

In some embodiments, computing device 1300 is an example of, or includes aspects of, the image generation apparatus as described with reference to FIGS. 1 and 5. In some embodiments, computing device 1300 includes one or more processors 1305 that can execute instructions stored in memory subsystem 1310 to obtain an original image, an anchor prompt describing an element of the original image, and a target prompt describing a modification to an element of the original image; compute a first output based on the anchor prompt and a second output based on the target prompt using a diffusion model; compute a difference between the first output and the second output; and generate a modified image including the modification to the element of the original image based on the difference.

According to some aspects, computing device 1300 includes one or more processors 1305. According to some aspects, processor(s) 1305 are included in the processor unit as described with reference to FIG. 5. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing.

According to some aspects, memory subsystem 1310 includes one or more memory devices. Memory subsystem 1310 is an example of, or includes aspects of, the memory unit as described with reference to FIG. 5. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1315 operates at a boundary between communicating entities (such as computing device 1300, one or more user devices, a cloud, and one or more databases) and channel 1330 and can record and process communications. In some cases, communication interface 1315 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1320 is controlled by an I/O controller to manage input and output signals for computing device 1300. In some cases, I/O interface 1320 manages peripherals not integrated into computing device 1300. In some cases, I/O interface 1320 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1320 or via hardware components controlled by the I/O controller.

According to some aspects, user interface component(s) 1325 enable a user to interact with computing device 1300. In some cases, user interface component(s) 1325 include an audio device, such as an external speaker system, an external display device such as a display screen, an input device (e.g., a remote control device interfaced with a user interface directly or through the I/O controller), or a combination thereof. In some cases, user interface component(s) 1325 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image generation, comprising:
obtaining an original image depicting an element and a target prompt describing a modification to the element;
computing a first output and a second output using a diffusion model, wherein the first output is based on a description of the element and the second output is based on the target prompt;
computing a difference between the first output and the second output by subtracting the first output from the second output; and
generating a modified image including the modification to the element of the original image based on the difference.

2. The method of claim 1, further comprising:
obtaining an anchor prompt that includes a first modifier of the element, wherein the description is based on the anchor prompt and the target prompt includes a second modifier that describes the modification to the element.

3. The method of claim 1, further comprising:
generating the description of the element based on the original image and the target prompt.

4. The method of claim 1, further comprising:
adding first noise to the original image to obtain a noise image; and
removing second noise from the noise image based on the difference to obtain the modified image.

5. The method of claim 4, further comprising:
computing a weighted sum of the first output and the difference, wherein the second noise is based on the weighted sum.

6. The method of claim 4, further comprising:
determining a number of noise addition steps for adding the first noise; and
computing the difference at each of a plurality of noise removal steps for removing the second noise.

7. The method of claim 1, further comprising:
obtaining a mask indicating a region corresponding to the element of the original image, wherein the modified image is generated based on the mask.

8. The method of claim 7, further comprising:
generating a noise map based on the original image and the mask, wherein the modified image is generated based on the noise map.

9. The method of claim 1, further comprising:
encoding an anchor prompt and the target prompt using a text encoder to obtain an encoded anchor prompt and an encoded target prompt, wherein the first output and the second output are based on the encoded anchor prompt and the encoded target prompt, respectively.

10. A non-transitory computer readable medium storing instructions that, when executed by a processor, cause the processor to:
obtain an original image depicting an element, an anchor prompt describing the element, and a target prompt describing a modification to the element;
compute a first output based on the anchor prompt and a second output based on the target prompt using a diffusion model;
compute a difference between the first output and the second output by subtracting the first output from the second output; and
generate a modified image including the modification to the element of the original image based on the difference.

11. The non-transitory computer readable medium of claim 10, wherein the instructions further cause the processor to:
add first noise to the original image to obtain a noise image; and
remove second noise from the noise image based on the difference to obtain the modified image.

12. The non-transitory computer readable medium of claim 11, wherein the instructions further cause the processor to:
compute a weighted sum of the first output and the difference, wherein the second noise is based on the weighted sum.

13. The non-transitory computer readable medium of claim 11, wherein the instructions further cause the processor to:
determine a number of noise addition steps for adding the first noise; and
compute the difference at each of a plurality of noise removal steps for removing the second noise.

14. The non-transitory computer readable medium of claim 10, wherein the instructions further cause the processor to:
obtain a mask indicating a region corresponding to the element of the original image, wherein the modified image is generated based on the mask.

15. The non-transitory computer readable medium of claim 10, wherein:
the anchor prompt includes a first modifier of the element and the target prompt includes a second modifier of the element, wherein the second modifier describes the modification to the element.

16. A system for image generation, comprising:
one or more processors;
one or more memory components coupled with the one or more processors; and
a diffusion model configured to compute a first output based on an anchor prompt and a second output based on a target prompt, compute a difference between the first output and the second output by subtracting the first output from the second output, and generate a modified image including a modification to an element of an original image based on the difference.

17. The system of claim 16, further comprising:
a mask generation model configured to generate a mask indicating a location of the element, wherein the modified image is generated based on the mask.

18. The system of claim 16, further comprising:
a noise component configured to add first noise to the original image to obtain a noise image, wherein the diffusion model is further configured to remove second noise from the noise image based on the difference to obtain the modified image.

19. The system of claim 16, further comprising:
a user interface configured to obtain the original image and the target prompt.

20. The system of claim 16, further comprising:
a text encoder configured to encode the anchor prompt and the target prompt to obtain an encoded anchor prompt and an encoded target prompt, wherein the first output and the second output are based on the encoded anchor prompt and the encoded target prompt, respectively.

* * * * *